US011223136B2

(12) United States Patent
Ahmed et al.

(10) Patent No.: US 11,223,136 B2
(45) Date of Patent: Jan. 11, 2022

(54) FEED CIRCUIT FOR ANTENNA OF ANGLE OF ARRIVAL MEASUREMENT SYSTEM

(71) Applicants: DENSO International America, Inc., Southfield, MI (US); DENSO CORPORATION, Kariya (JP)

(72) Inventors: Osman Ahmed, Bloomfield Hills, MI (US); Warren Guthrie, West Olive, MI (US); Raymond Michael Stitt, Ada, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 16 days.

(21) Appl. No.: 16/871,351

(22) Filed: May 11, 2020

(65) Prior Publication Data

US 2020/0373675 A1 Nov. 26, 2020

Related U.S. Application Data

(60) Provisional application No. 62/852,386, filed on May 24, 2019.

(51) Int. Cl.
*H01Q 1/32* (2006.01)
*H01Q 11/08* (2006.01)
(Continued)

(52) U.S. Cl.
CPC .............. *H01Q 11/08* (2013.01); *G01S 3/46* (2013.01); *H01Q 1/38* (2013.01); *H01Q 21/22* (2013.01)

(58) Field of Classification Search
CPC .......... H01Q 11/08; H01Q 1/38; H01Q 21/22; H01Q 21/0006; H01Q 21/08; H01Q 21/24;
(Continued)

(56) References Cited

U.S. PATENT DOCUMENTS 9,688,247 B1 6/2017 Jayaraman et al.
9,794,753 B1 10/2017 Stitt et al.
(Continued)

FOREIGN PATENT DOCUMENTS

BR 102014017465 A2 2/2016
CN 104574593 A 4/2015
(Continued)

*Primary Examiner* — David E Lotter
(74) *Attorney, Agent, or Firm* — Harness, Dickey & Pierce, P.L.C.

(57) ABSTRACT

A feed circuit for feeding an antenna includes: a first coupler including a first pair of opposing conductive elements; a second coupler including a second pair of opposing conductive elements; a third coupler including a third pair of opposing conductive elements; a delay line; first terminals configured to connect to the antenna; second terminals connected to a ground reference; and a feed terminal connected to the first coupler and configured to receive at least one of a transmit signal to be transmitted from the antenna or a combined received signal from the antenna. The first terminals are connected to the second coupler and the third coupler and configured to output a signal at different phases to conductive elements of the antenna. The second terminals are connected to the first coupler, the second coupler and the third coupler.

20 Claims, 36 Drawing Sheets

(51) Int. Cl.
  *H01Q 1/38* (2006.01)
  *H01Q 21/22* (2006.01)
  *G01S 3/46* (2006.01)

(58) Field of Classification Search
  CPC ......... H01Q 1/3275; G01S 3/46; G01S 3/023; G01S 3/48; G01S 5/0284; G01S 2205/01; G07C 2009/00793; G07C 9/00309
  See application file for complete search history.

(56) References Cited

U.S. PATENT DOCUMENTS

| | | | |
|---|---|---|---|
| 9,894,492 B1 | 2/2018 | Elangovan et al. | |
| 10,002,479 B2 | 6/2018 | Oz et al. | |
| 10,244,476 B2 | 3/2019 | Elangovan et al. | |
| 10,328,898 B2 | 6/2019 | Golsch et al. | |
| 10,328,899 B2 | 6/2019 | Golsch | |
| 10,328,900 B1 | 6/2019 | Yakovenko et al. | |
| 2004/0017328 A1* | 1/2004 | Merrill | H01Q 21/0006 343/895 |
| 2008/0174501 A1* | 7/2008 | Licul | H01Q 11/08 343/703 |
| 2011/0215921 A1 | 9/2011 | Ben Ayed et al. | |
| 2012/0045058 A1 | 2/2012 | Weghaus | |
| 2014/0274013 A1 | 9/2014 | Santavicca | |
| 2015/0148989 A1 | 5/2015 | Cooper et al. | |
| 2015/0161832 A1 | 6/2015 | Esselink et al. | |
| 2015/0310681 A1 | 10/2015 | Avery et al. | |
| 2015/0356797 A1 | 12/2015 | McBride et al. | |
| 2016/0150407 A1 | 5/2016 | Michaud et al. | |
| 2017/0062938 A1 | 3/2017 | Cheng et al. | |
| 2017/0104589 A1 | 4/2017 | Lambert et al. | |
| 2017/0132533 A1 | 5/2017 | Darnell et al. | |
| 2017/0309098 A1 | 10/2017 | Watters et al. | |
| 2017/0330402 A1 | 11/2017 | Menard et al. | |
| 2018/0029560 A1 | 2/2018 | Mohaupt et al. | |
| 2018/0099643 A1 | 4/2018 | Golsch et al. | |
| 2018/0103414 A1 | 4/2018 | Golsch | |
| 2018/0126952 A1 | 5/2018 | Niemiec | |
| 2018/0154865 A1 | 6/2018 | Bianchi, III et al. | |
| 2018/0269565 A1 | 9/2018 | Guthrie et al. | |

FOREIGN PATENT DOCUMENTS

| | | |
|---|---|---|
| WO | WO-16156682 A1 | 10/2016 |
| WO | WO-2017181050 A1 | 10/2017 |
| WO | WO-18040641 A1 | 3/2018 |

\* cited by examiner

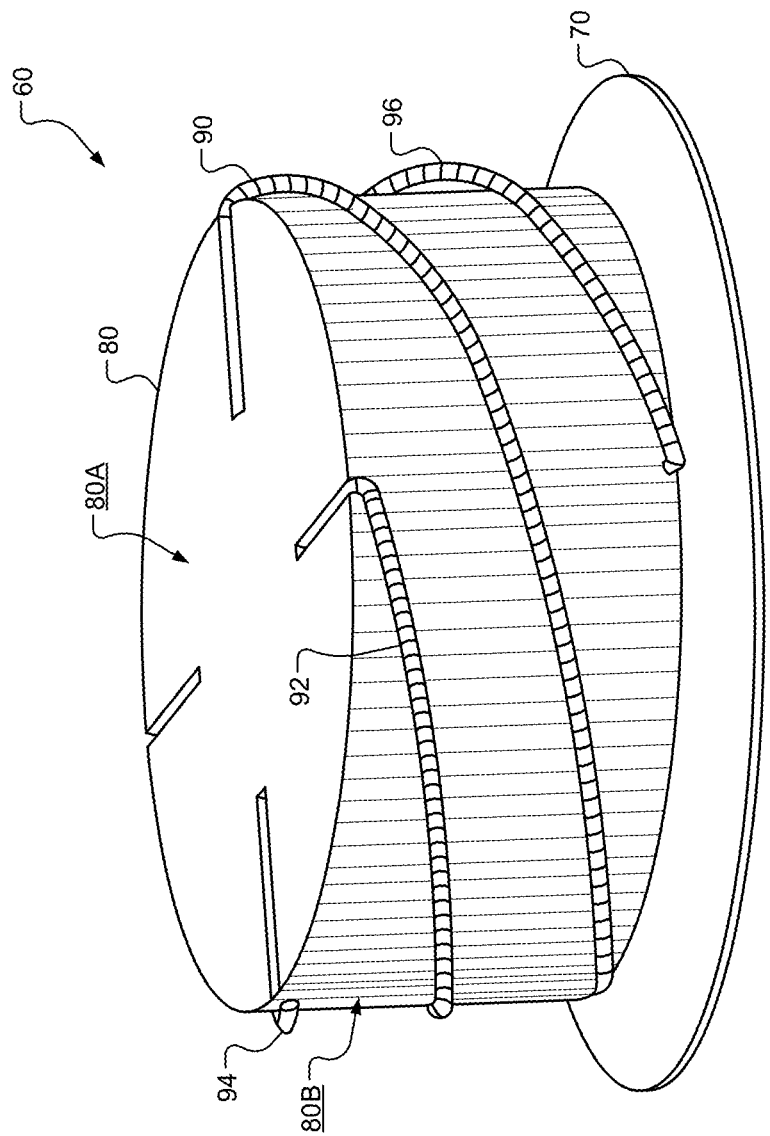

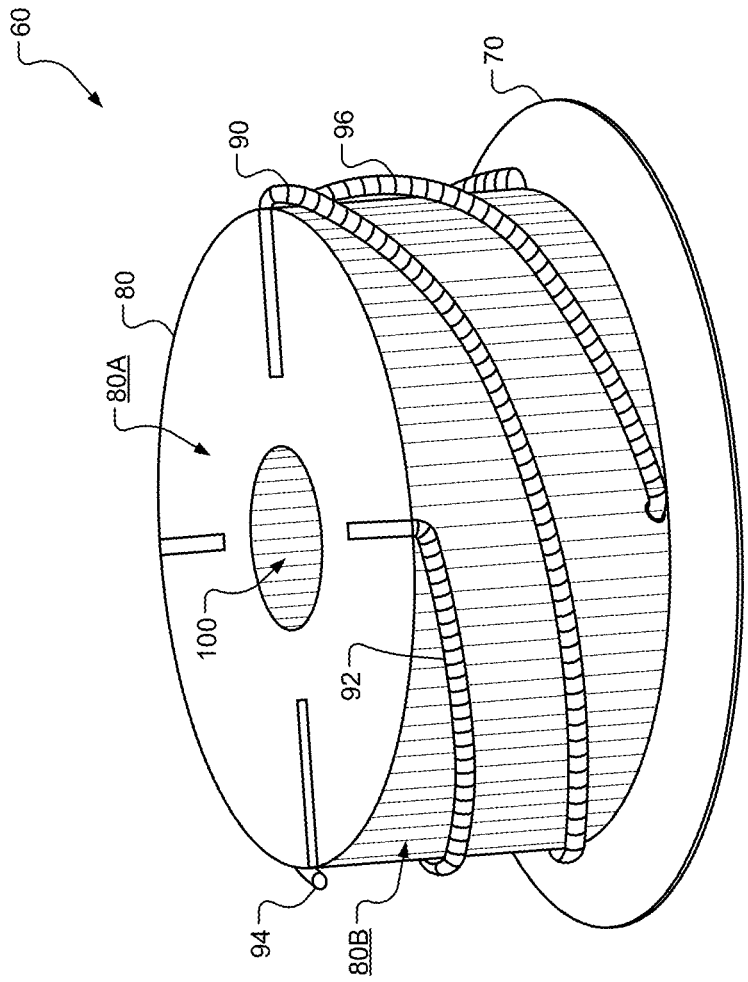

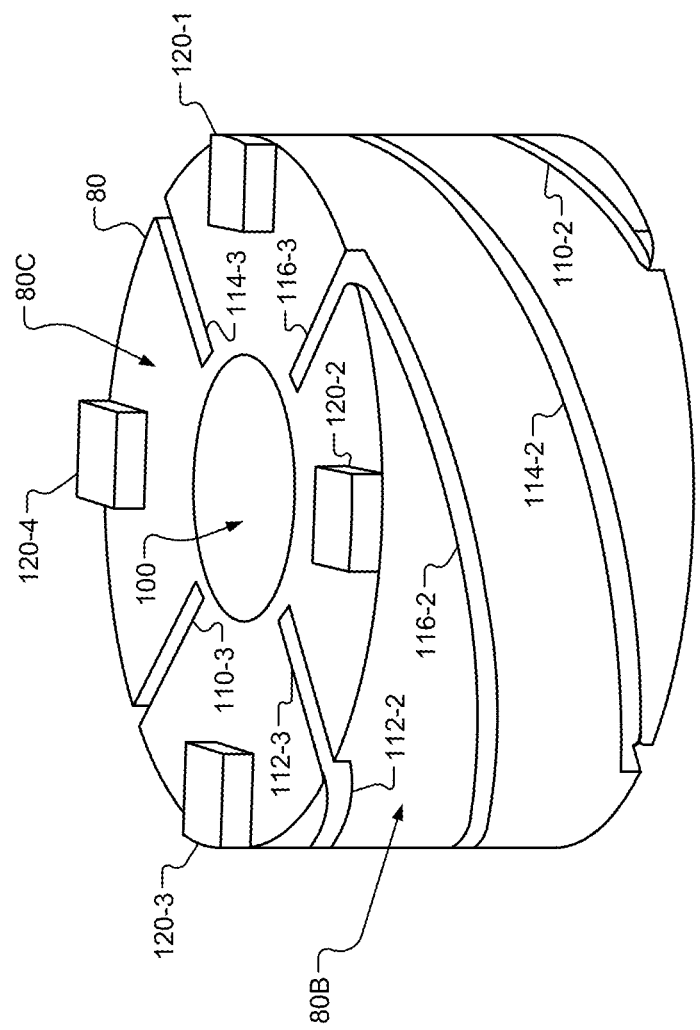

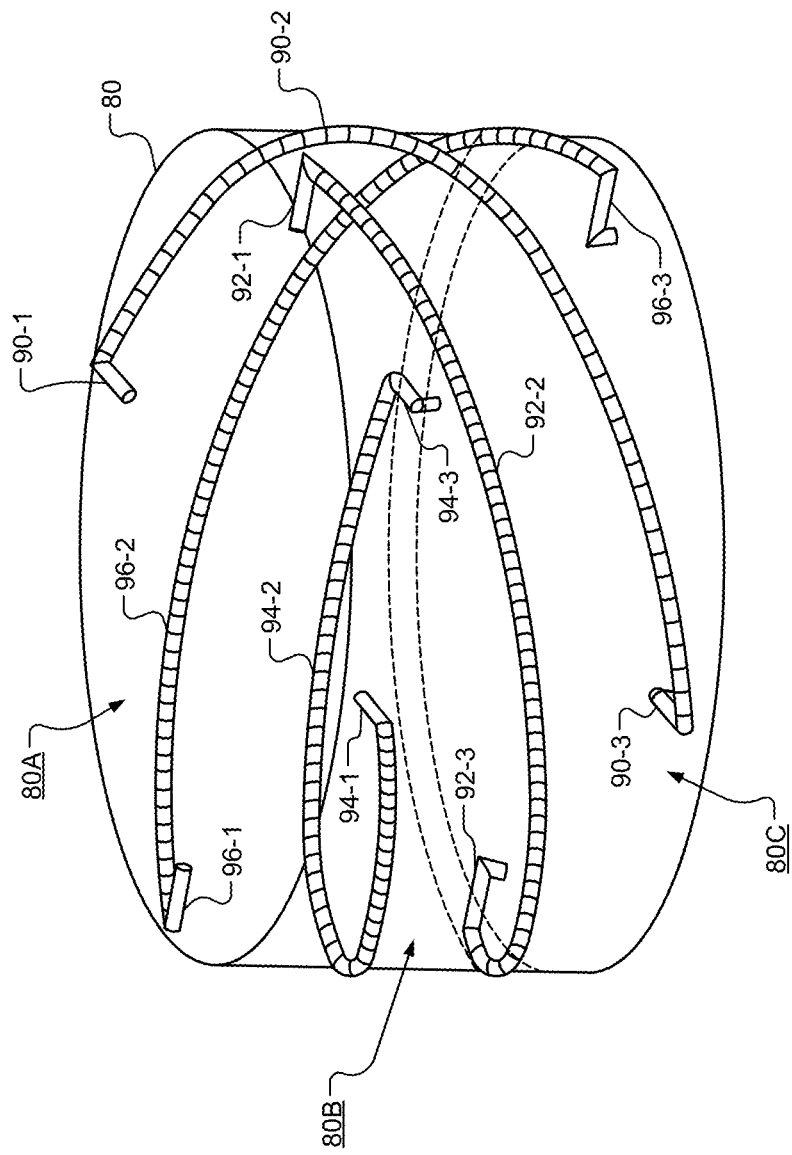

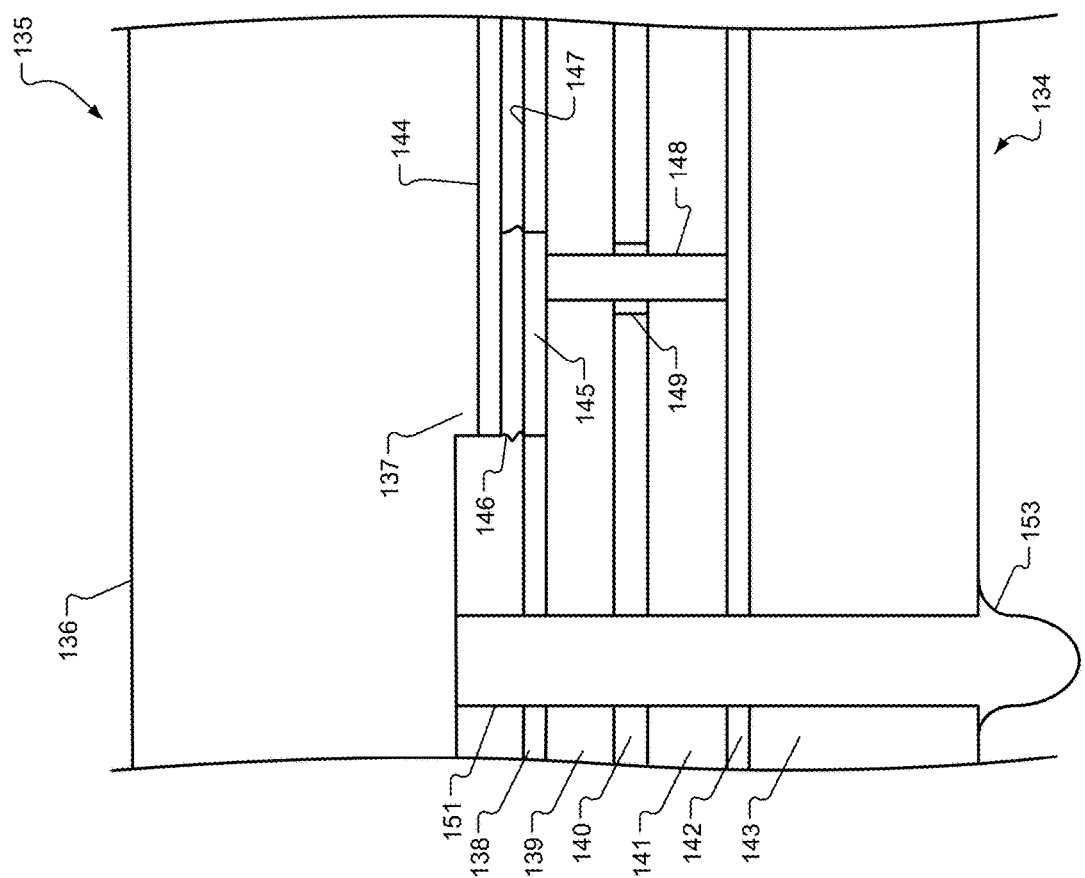

FEED CIRCUIT FOR ANTENNA OF ANGLE OF ARRIVAL MEASUREMENT SYSTEM

CROSS-REFERENCE TO RELATED APPLICATIONS

This application claims the benefit of U.S. Provisional Application No. 62/852,386, filed on May 24, 2019. The entire disclosure of the above application is incorporated herein by reference.

FIELD

The present disclosure relates to angle of arrival measurement systems including circular polarized and/or linear antennas.

BACKGROUND

This section provides background information related to the present disclosure and is not necessarily prior art.

Conventional passive entry/passive start (PEPS) systems, which are vehicle systems that include a keyless entry system, may provide a user access to various vehicle functions if the user possesses a key fob that has been previously paired with a vehicle's central PEPS electronic control unit (ECU). As an example, the user in possession of the key fob may unlock and enter the vehicle by grabbing the door handle. As another example, the user in possession of the key fob may activate a vehicle function by pushing a button on the key fob. In response to pushing the button, the central PEPS ECU authenticates the key fob to determine if the key fob is authorized to access the vehicle and uses the signal strength obtained by a plurality of sensors to estimate the distance between the key fob and the vehicle and the location of the key fob relative to the vehicle. If the key fob is authenticated and is located within an authorizing zone, the PEPS system makes the corresponding vehicle function available to the user (i.e., the vehicle is started).

Conventional PEPS systems use proprietary grade radio protocols using low frequency (LF) signals of approximately 125 kHz. LF systems were implemented by conventional PEPS systems because the wave propagation enables relatively accurate estimation of a distance between the key fob and the vehicle and the location of the key fob relative to the vehicle by using signal strengths within a target activation range of, for example, 2 meters. However, due to the extremely long wavelength of the LF signal relative to the size of a vehicle antenna and key fob receiver, it is difficult to reliably communicate with a key fob using LF systems beyond a few meters within reasonable power consumption and safe transmit power levels. As such, it is difficult to make any of the vehicle's functions available to the user when the key fob is located more than a few meters away from the vehicle.

Accordingly, key fobs are presently being implemented by smart devices, such as smartphones and wearable devices, wherein the smart devices are able to communicate at a range greater than the activation range of LF systems, such as 100 meters. As such, smart devices enable the availability of various vehicle functions and long range distancing features, such as passive welcome lighting, distance bounding on remote parking applications, etc.

However, antenna systems of current PEPS systems may prevent the PEPS system from accurately estimating RSSI power, distances and angles for RSSI power, differential RSSI power, trilateration measurements, triangulation measurements, and correlation finger printing locationing values for signal transmission between the key fob and the vehicle. Antenna systems of current PEPS system may also prevent the PEPS system from accurately estimating the location of the key fob relative to the vehicle.

SUMMARY

This section provides a general summary of the disclosure, and is not a comprehensive disclosure of its full scope or all of its features.

A feed circuit for feeding an antenna is provided. The feed circuit includes: a first coupler including a first pair of opposing conductive elements; a second coupler including a second pair of opposing conductive elements; a third coupler including a third pair of opposing conductive elements; a delay line; first terminals configured to connect to the antenna; second terminals connected to a ground reference; and a feed terminal connected to the first coupler and configured to receive at least one of a transmit signal to be transmitted from the antenna or a combined received signal from the antenna. The first terminals are connected to the second coupler and the third coupler and configured to output a signal at different phases to conductive elements of the antenna. The second terminals are connected to the first coupler, the second coupler and the third coupler.

In other features, the delay line extends from the first coupler to the third coupler.

In other features, the feed terminal is configured to receive the transmit signal to be transmitted from the antenna. Each of the first coupler, the second coupler, the third coupler and the delay line phase shift the transmit signal by 90°.

In other features, the first opposing pair of conductive elements includes a first conductive element disposed over a second conductive element. The second opposing pair of conductive elements includes a third conductive element disposed over a fourth conductive element. The third opposing pair of conductive elements includes a fifth conductive element disposed over a sixth conductive element.

In other features, a width of the first conductive element is smaller than a width of the second conductive element. A width of the third conductive element is smaller than a width of the fourth conductive element. A width of the fifth conductive element is smaller than a width of the sixth conductive element.

In other features, a shape of the first conductive element matches a shape of the second conductive element. A shape of the third conductive element matches a shape of the fourth conductive element. A shape of the fifth conductive element matches a shape of the sixth conductive element.

In other features, only one conductive element extends between the feed terminal and one of the first terminals.

In other features, the first opposing pair of conductive elements include a first conductive element and a second conductive element. The second opposing pair of conductive elements includes a third conductive element and a fourth conductive element. The second conductive element is connected to the feed terminal. Fourth conductive element is connected to one of the second terminals. The first conductive element and the third conductive element are integrally formed as a single conductive element, which extends between the feed terminal and the one of the second terminals. The second conductive element and the fourth conductive element do not extend between the feed terminal and the one of the second terminals.

In other features, an angle-of-arrival measurement system includes: the feed circuit; the antenna; and a control module configured to determine an angle-of-arrival of the received signal.

In other features, a perimeter of the feed circuit is smaller than a perimeter of the antenna.

In other features, the antenna is a quadrifilar helix antenna. The quadrifilar helix antenna includes conductive elements connected respectively to the first terminals.

In other features, a feed circuit for an antenna is provided. The feed circuit includes: a component layer including resistors, where the resistors are connected to a ground reference; a first ground layer disposed on the component layer; a first signal layer disposed on the first ground layer and including a feed terminal, first conductive elements and a delay line, where one of the first conductive elements is connected to one of the resistors; a second signal layer disposed on the first signal layer and including second conductive elements, where first ones of the second conductive elements are connected to some of the resistors; a second ground layer disposed on the second signal layer; and an antenna mounting layer including first terminals configured to connect to the antenna and configured to transmit via the antenna phase shifted versions of a signal received at the feed terminal. The first terminals are configured to connect to some of the first conductive elements and second ones of the second conductive elements.

In other features, two of the second conductive elements are connected to two of the resistors.

In other features, the first ground layer transfers signals of components in the component layer.

In other features, the second ground layer isolates the antenna from the first signal layer and the second signal layer.

In other features, widths of the first conductive elements are wider than widths of the second conductive elements.

In other features, the first conductive elements and the second conductive elements provide a first coupler, a second coupler, and a third coupler.

In other features, the first coupler, the second coupler, the third coupler, and the delay line phase shift a transmit signal by 90°.

In other features, the feed circuit further includes vias connecting the terminals to the some of the first conductive elements and second ones of the second conductive elements.

In other features, second terminals are connected to one of the first conductive elements and two of the second conductive elements. Vias connect the second terminals respectively to the resistors.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 6A-6B are illustrations of an example antenna assembly (or antenna) of the antenna system in accordance with an embodiment of the present disclosure.

FIGS. 7A-7D are illustrations of an example antenna including multiple antenna elements in accordance with an embodiment of the present disclosure.

FIGS. 8-9 are illustrations of another example antenna including antenna elements in accordance with an embodiment of the present disclosure.

FIG. 15 illustrates a portion of a printed circuit board including a portion of an antenna mounted on the printed circuit board in accordance with an embodiment of the present disclosure.

Corresponding reference numerals indicate corresponding parts throughout the several views of the drawings.

DETAILED DESCRIPTION

Figure 1:
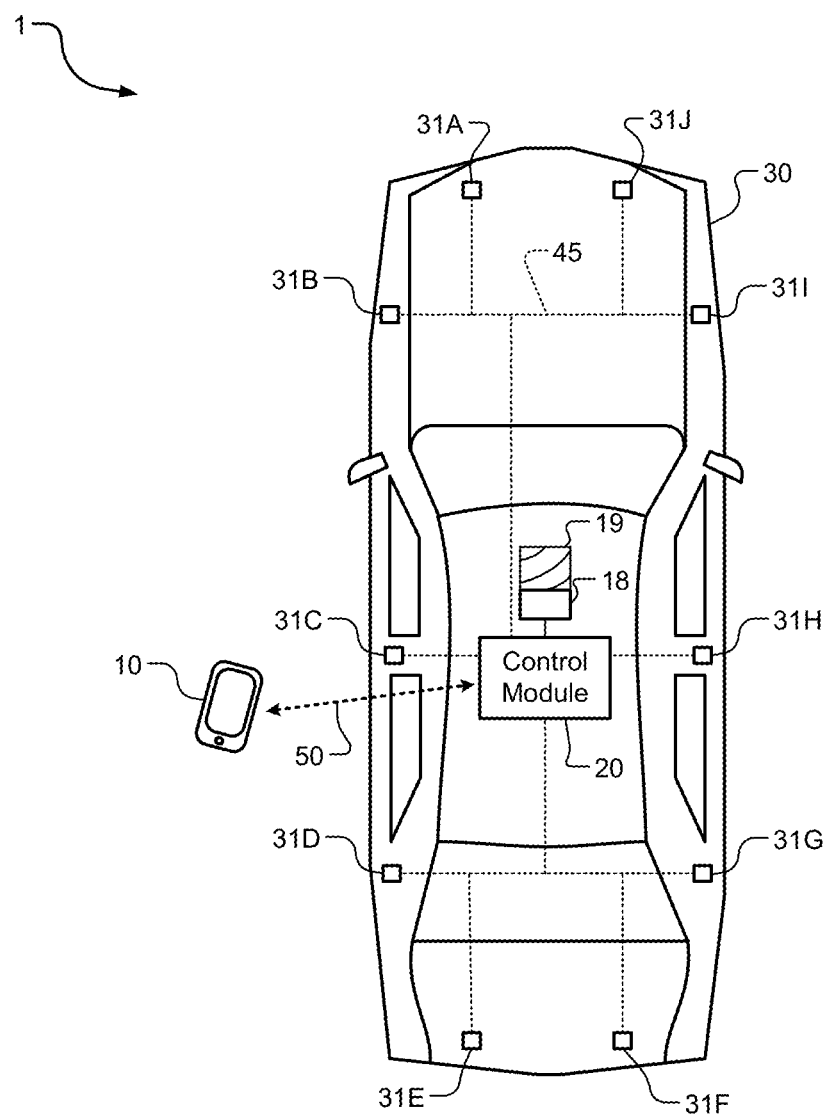
FIG. 1 is an illustration of a portable device and a vehicle implementing one or more feed circuits in accordance with an embodiment of the present disclosure.

An angle-of-arrival (AOA) measurement system includes an AOA antenna that has a set of circular polarized antennas and/or a set of linear polarized antennas. The AOA antenna requires phase adjustments for corresponding conductive feed lines to satisfy radiation performance and phase sensitivity accuracy requirements to accurately detect phase of an incoming signal regardless of an orientation of a mobile access device (e.g., a key fob, mobile phone, or other mobile access device). The incoming signal has a magnitude (or amplitude) and phase, based on which the AOA measurement system operates.

An AOA antenna, such as a quadrifilar antenna, which is a circular polarized antenna, needs four conductive elements at 90° phase offset from each other. A feed network (or circuit) may be used to phase delay a signal to provide 0°, 90°, 180°, and 270° offset signals to respectively feed the conductive elements of the quadrifilar antenna. A quadrifilar antenna requires four port feeding with signal conditioning. The feed circuit may include discrete components or one or more integrated components.

A feed circuit including discrete components experiences large environmental issues and ages quickly. The discrete components may refer to inductors and capacitors used to feed signals to the conductive elements of the AOA antenna. Feed circuits including discrete components and feed circuits implemented as integrated components experience large manufacturing tolerance variability and tolerance inaccuracies, which cause AOA estimation errors and large variations with changes in temperature. An integrated component in this example refers to a whole feed circuit implemented as a single chip including components of the feed circuit. As an example, target phase angles of the four conductive elements of an AOA antenna may be 0°, 90°, 180°, and 270°. An integrated component feed circuit may have 0°, 90°, 170°, and 260° due to variability associated with the integrated circuit, which negatively affects phase determinations.

Examples disclosed herein include feed circuits implemented as PCBs. A feed circuit implemented as a PCB experiences less environmental issues, has a longer lifespan (or service life) and has less manufacturing tolerance inaccuracies as compared to a feed circuit including discrete components or implemented as an integrated circuit. The PCB implementation has reduced environmental and aging tolerance variability for improved accuracy. The feed circuit implementations are compact, such that a perimeter of each of the feed circuits fits within and/or is smaller than a perimeter of a corresponding quadrifilar antenna.

Antennas that receive and/or transmit in a linear polarized pattern having a typical "doughnut" shape cannot be placed near metal of a vehicle because the antenna and metal form a combined antenna system. The metal of the vehicle electromagnetically shorts out the antenna, which reduces link margin. Link margin refers to an amount of power needed in a received signal in order to differentiate, for example, 1s and 0s of the received signal.

Linear polarized antennas in typical microlocating systems have small link margin when the antennas are cross polarized to with antennas in key fobs or smart devices. Antennas of key fobs are typically linear polarized antennas. The power transferred over the link and in a particular direction varies wildly as orientation of the linear polarized key fob antenna changes in a typical reflective environment. This degrades microlocation performance in a PEPS system. The circular polarized quadrifilar helix antenna electronics disclosed herein overcomes these limitations.

Circular polarized patch antennas and electronics can be placed on ground planes and near ground planes, but they need large ground planes behind them to become directional. Large metal ground planes are not readily available in the areas of the outside of a vehicle that are composed of plastic. Using a ground plane to make a directional antenna increases the size of the module, reducing the areas where the module may be packaged in a vehicle, which can make the module less useful. Also, traditional circular polarized patch antennas, couple in the RF domain to the ground plane, cause an array of antennas to couple together reducing angle of arrival and angle of departure microlocation performance.

Circular polarized antennas that radiate in two half hemispheres, such as a patch antenna, exhibit better microlocation performance when implemented in a PEPS system than linear polarized antennas. Circular polarized antennas may be placed close to metal of a vehicle. In so doing, the metal of the vehicle may be used as a ground plane. The circular polarized antennas in combination with the ground plane provide a half hemisphere radiation pattern. The circular polarized antennas capacitively couple to the ground plane and the power or ground lines of the corresponding electronics. This coupling creates an antenna system with a center of reception that varies as cabling and physical placement of the antenna electronic system varies, which can degrade PEPS system performance.

The circular polarized antennas may be placed to abut the metal of the vehicle, but cannot be placed at arbitrary distances from the metal of the vehicle because the metal may short the antenna system. To radiate in one direction, the circular polarized antennas need electronics module ground planes or vehicle body metal ground planes that are about a signal wavelength across as size. As a result, packaging the PEPS modules in a vehicle is difficult and not practical. Depending on the packaging, PEPS system performance can be negatively affected.

The examples set forth herein include use of quadrifilar helix antennas having half hemisphere circular polarized radiation patterns that minimize link power variation, provide directional reception, have an radio frequency (RF) center, and minimize phase variation error with variation of key fob antenna polarization. Key fob polarization variation may be due to key fob construction and key fob position and orientation relative to the quadrifilar helix antennas. Quadrifilar helix antennas may be placed at arbitrary distances from each other and/or metal of a vehicle and may include require ground planes that are not larger than the antennas. Quadrifilar helix antennas may also be placed close together in various angular measuring configurations. These characteristics improve PEPS system performance and PEPS system vehicle packaging for received signal strength indicator (RSSI), angle of arrival, angle of departure, round trip time of flight, and carrier phase-based ranging microlocation techniques. This quadrifilar helix antenna construction allows the size of the antennas to be reduced while tuning the antenna frequencies to a given band. This quadrifilar helix antenna construction allows signal receive characteristics to be similar regardless of the orientation of a key fob.

Example embodiments will now be described more fully with reference to the accompanying drawings.

Figure 2:
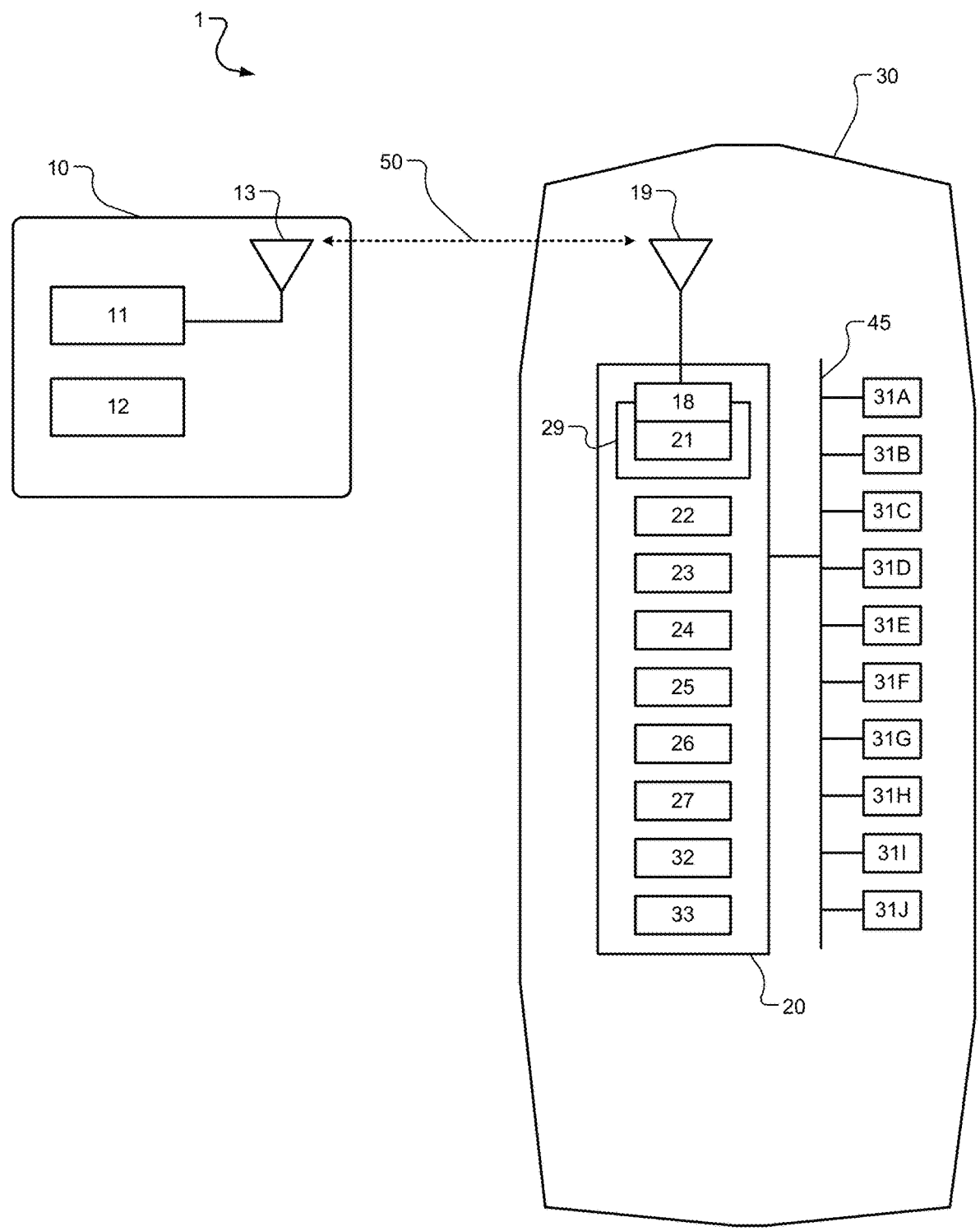
FIG. 2 is a functional block diagram of a portable device and a vehicle implementing one or more feed circuits in accordance with an embodiment of the present disclosure.

With reference to FIGS. 1-2, a PEPS system 1 is provided within a vehicle 30 and includes a control module 20 and sensors 31A-31J (collectively referred to as sensors 31). The control module 20 may be configured or programmed to measure or exchange RSSIs, angle-of-departure-transmission values, angle-of-arrival-reception values, round trip time of flight values, and/or carrier phase based ranging information. While FIGS. 1-2 illustrate ten sensors 31A-31J, any number of sensors may be used. Each of the sensors 31 may be configured or programmed to measure or exchange RSSIs, angle-of-departure-reception values, angle-of-arrival-transmission values, round trip time of flight values, and/or carrier phase based ranging information. Although a single control module 20 is shown, the PEPS system 1 may include one or more control modules 20 that are distributed throughout the vehicle 30.

The one or more control modules 20 and the sensors 31 may communicate with each other using a vehicle interface 45. As an example, the vehicle interface 45 may include a controller area network (CAN) bus for communication between main modules. As another example, the vehicle interface 45 may include a local interconnect network (LIN) for lower data-rate communication. In other embodiments, the vehicle interface 45 may include a clock extension peripheral interface (CXPI) bus. Additionally or alternatively, the vehicle interface 45 may include any combination of the CAN bus, LIN, CXPI, radio frequency, and electronic bus communication interfaces.

Referring now also to FIG. 2, the control module 20 may include a communication gateway 29, which includes a wireless communication chipset (or transceiver) 21 connected to one or more antennas 19 (one is shown) by one or more feed circuits 18 (one is shown). The feed circuit may be implemented as any of the feed circuits disclosed herein. Although a single feed circuit is shown in FIGS. 1-2, any number of feed circuits may be included and connected to respective antennas. For example, the wireless communication chipset 21 may be a Bluetooth low energy (BLE) communication chipset that utilizes the BLE communication protocol. Alternatively, other wireless communication protocols, such as Wi-Fi or Wi-Fi directed, may be used. As shown in FIG. 2, the antennas 19 may be located in the vehicle 30. Alternatively, the antennas 19 may be located outside of the vehicle 30 or within the control module 20. The control module 20 may also include a link authentication module 22 that authenticates the portable device 10 for communication via communication link 50. As an example, the link authentication module 22 may be configured to execute challenge-response authentication or other cryptographic verification algorithms in order to authenticate the portable device 10.

The control module 20 may also include a data management layer 23 for push data. As an example, the data management layer 23 is configured obtain vehicle information obtained by any of the modules (e.g., location information obtained by a telematics module 26) and transmit the vehicle information to the portable device 10.

The control module 20 may also include a connection information distribution module 24 that is configured to obtain information corresponding to the communication channels and channel switching parameters of the communication link 50 and transmit the information to the sensors 31. In response to the sensors 31 receiving the information from the connection information distribution module 24 via the vehicle interface 45 and the sensors 31 being synchronized with the communication gateway 29, the sensors 31 may locate and follow, or eavesdrop on, the communication link 50.

The control module 20 may also include a timing control module 25, which obtains timing information corresponding to the communication link 50 when the link authentication module 22 executes challenge-response authentication. Furthermore, the timing control module 25 is configured to provide the timing information to the sensors 31 via the vehicle interface 45.

The control module 20 may also include the telematics module 26, which is configured to generate location information and/or error of location information associated with the vehicle 30. The telematics module 26 may be implemented by a global navigation satellite system (e.g., GPS), inertial navigation system, global system for mobile communication (GSM) system, or other location system.

The control module 20 may also include a security filtering module 33 that is configured to detect violations of the physical layer and protocol and filter the data accordingly before providing the information to a sensor processing and localization module 32. The security filtering module 33 may also be configured to flag data as injected so that the sensor processing and localization module 32 may discard the flagged data and alert the PEPS system 1. The data from the sensor processing and localization module 32 is provided to a PEPS module 27, which is configured to read vehicle state information from the sensors 31 in order to detect user intent to access a vehicle function and to compare the location of the portable device 10 to the set of locations that authorize certain functions, such as unlocking a door of the vehicle 30 and/or starting the vehicle 30.

In order to carry out the above functionality of the various modules described above, the control module 20 may also include one or more processors that are configured to execute instructions stored in a non-transitory computer-readable medium, such as a read-only memory (ROM) and/or random access memory (RAM). One or more of the transceiver 21 and the modules 22-33 may be implemented as part of the feed circuit 18, as further described below. Similarly, a portion or all of the control module 20 and/or the communication gateway 29 may be implemented as part of the feed circuit 18.

As shown in FIGS. 1-2, a portable device 10 may communicate with the communication gateway 29 of the vehicle 30 via the communication link 50. Without limitation, the portable device 10 may be, for example, any Bluetooth-enabled communication device, such as a smart phone, smart watch, wearable electronic device, key fob, tablet device, Bluetooth transmitter device, or other device associated with a user of the vehicle 30, such as an owner, driver, passenger of the vehicle 30, and/or a technician for the vehicle 30. Additionally or alternatively, the portable device 10 may be configured for wireless communication via another wireless communication protocol, such as Wi-Fi and/or Wi-Fi direct. The communication link 50 may be a Bluetooth communication link as provided for and defined by the Bluetooth specification. As an example, the communication link 50 may be a BLE communication link. Alternatively, the communication link 50 may be a Wi-Fi or Wi-Fi direct communication link.

The portable device 10 may include a wireless communication chipset (or transceiver) 11 connected to an antenna 13. The wireless communication chipset 11 may be a BLE communication chipset. Alternatively, the wireless communication chipset 11 may be a Wi-Fi or Wi-Fi direct communication chipset. The portable device 10 may also include application code 12 that is executable by the processor of the portable device 10 and stored in a non-transitory computer-readable medium, such as a read-only memory (ROM) or a random-access memory (RAM). Based on the application code 12 and using the wireless communication chipset 11 and the antenna 13, the portable device 10 may be configured to execute various instructions corresponding to, for example, authentication of the communication link 50, transmission of location and/or velocity information obtained by a global navigation satellite system (e.g., GPS) sensor or accelerometer of the portable device 10, and manual activation of a vehicle function.

Figure 3:
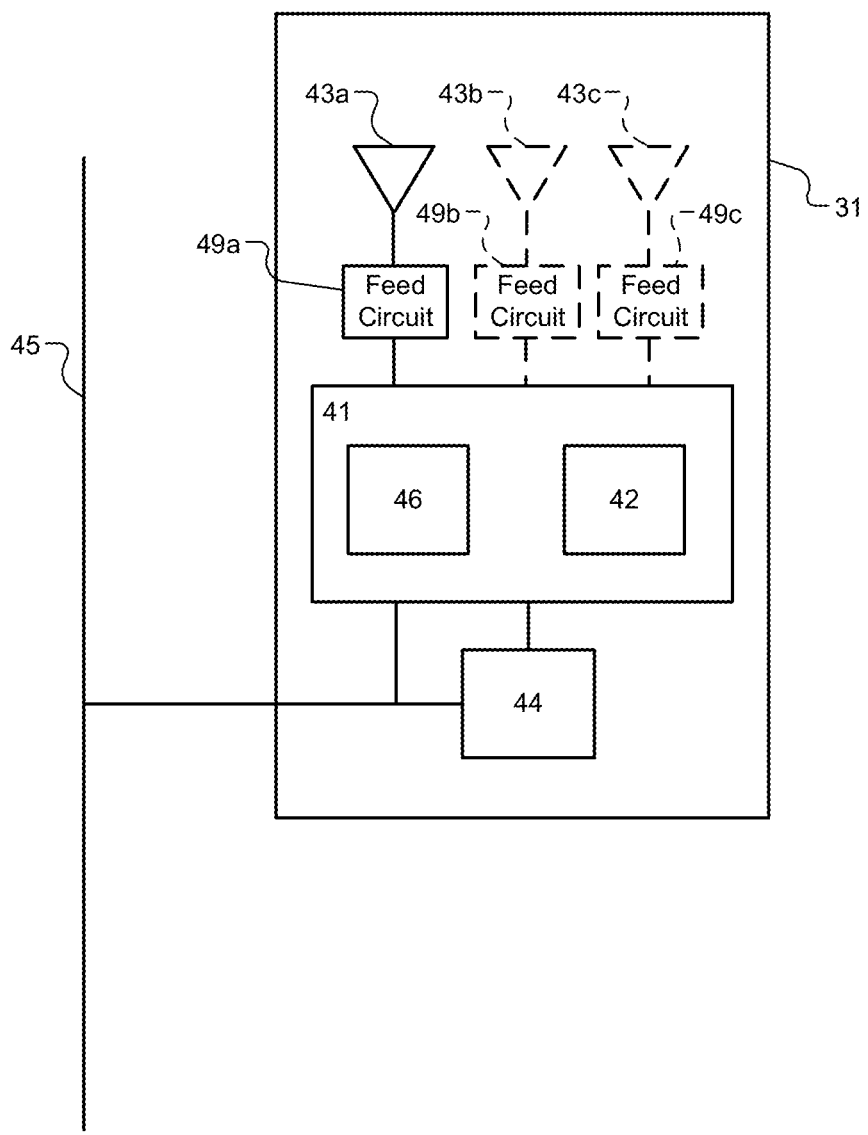
FIG. 3 is a functional block diagram of a sensor of a vehicle implementing feed circuits in accordance with an embodiment of the present disclosure.

With reference to FIG. 3, each of the sensors 31 includes a wireless communication chipset 41 connected to an antenna (or antenna assembly) 43, which may include multiple antenna elements. Any number of antennas 43 may be included in each of the sensors 31. In FIG. 3, three antennas 43a, 43b, and 43c are shown. The wireless communication chipset 41 may be a BLE communication chipset. Alternatively, the wireless communication chipset 41 may be a Wi-Fi or Wi-Fi direct communication chipset. As shown in FIG. 3, the antennas 43 may be located internal to the sensors 31. Alternatively, the antennas 43 may be located external to the sensors 31. The antennas 43 are described below in further detail with reference to FIGS. 5-12.

The control module 20 and, more specifically, the communication gateway 29, can establish a secure communication connection, such as communication link 50, with the portable device 10. For example, the control module 20 can establish a secure communication connection using the BLE communication protocol. The control module 20 can then communicate information about the secure communication connection, such as timing and synchronization information, to each of the sensors 31. For example, the control module 20 can communicate information about the secure communication connection, such as the timing of the next communication connection event, the timing interval between communication connection events, the communication channel for the next communication connection event, a channel map, a channel hop interval or offset to calculate the channel for subsequent communication connection events, communication latency information, communication jitter information, etc. The sensors 31 can then eavesdrop on communication packets sent by the portable device to the control module 20 and can measure signal information of the signals received from the portable device 10. For example, the sensors 31 can measure the received signal strength and determine a received signal strength indicator (RSSI) value. Additionally or alternatively, the sensors 31 can determine other measurements of the signals received from the portable device 10, such as an angle of arrival, a time of arrival, angle of departure, a time difference of arrival, round trip time of flight distance, carrier phase based-ranging distance, etc.

The sensors 31 can then communicate the measured information to the control module 20, which can then determine a location of the portable device 10 or a distance to the portable device 10 based on the measured information received from each of the sensors 31. For example, the control module 20 can determine the location of the portable device 10 based on, for example, the patterns of the RSSI values received for the various signals received from the portable device 10 by the various sensors 31. For example, a relatively strong RSSI generally indicates that the portable device 10 is closer and a relatively weak RSSI generally indicates that the portable device 10 is farther away. By analyzing the RSSI for communication signals sent by the portable device 10 with each of the sensors 31, the control module 20 can determine a location of or distance to the portable device 10 relative to the vehicle 30. Additionally or alternatively, angle of arrival or time difference of arrival measurements for the signals sent by the portable device 10 and received by the sensors 31 can also be used by the control module 20 to determine the location of the portable device 10. Additionally or alternatively, the sensors 31 themselves can determine a location of the portable device 10 or distance to the portable device 10 based on the measured information and can communicate the location or distance to the control module 20.

Based on the determined location or distance of the portable device 10 relative to the vehicle 30, the PEPS system 1 can then authorize or perform a vehicle function, such as unlocking a door of the vehicle 30, unlocking a trunk of the vehicle 30, starting the vehicle 30, and/or allowing the vehicle 30 to be started. For example, if the portable device 10 is less than a first distance threshold to the vehicle 30, the PEPS system 1 can activate interior or exterior lights of the vehicle 30. If the portable device 10 is less than a second distance threshold to the vehicle, the PEPS system 1 can unlock doors or a trunk of the vehicle 30. If the portable device 10 is located inside of the vehicle 30, the PEPS system 1 can allow the vehicle 30 to be started.

With reference to FIG. 3, when the BLE communication protocol is used, the sensors 31 receive BLE signals using the antennas 43 and, specifically, receive BLE physical layer messages using one or more feed circuits 49 and a BLE physical layer (PHY) controller 46. The feed circuits may each be configured similarly as any of the feed circuits disclosed herein. The sensors 31 can be configured to observe BLE physical layer messages and obtain measurements of the physical properties of the associated signals, including, for example, the received signal strength indication (RSSI) using a channel map that is produced by a channel map reconstruction module 42. Additionally or alternatively, the sensors 31 may communicate with each other and/or communicate with the communication gateway 29 via the vehicle interface 45 to determine time difference of arrival, time of arrival, or angle of arrival data for signals received by multiple sensors 31.

A timing synchronization module 44 is configured to accurately measure the reception times of messages on the vehicle interface 45 and pass the timing information to the wireless communication chipset 41. The wireless communication chipset 41 is configured to tune the PHY controller 46 to a specific channel at a specific time based on the channel map information and the timing signals. Furthermore, when the BLE communication protocol is used, the wireless communication chipset 41 is configured to observe all physical layer messages and data that conform to the Bluetooth physical layer specification, which includes the normal data rates proposed or adopted in, for example, the Bluetooth Specification version 5.0. The data, timestamps, and measured signal strength may be reported by the wireless communication chipset 41 to the various modules of the control module 20 via the vehicle interface 45.

Figure 4:
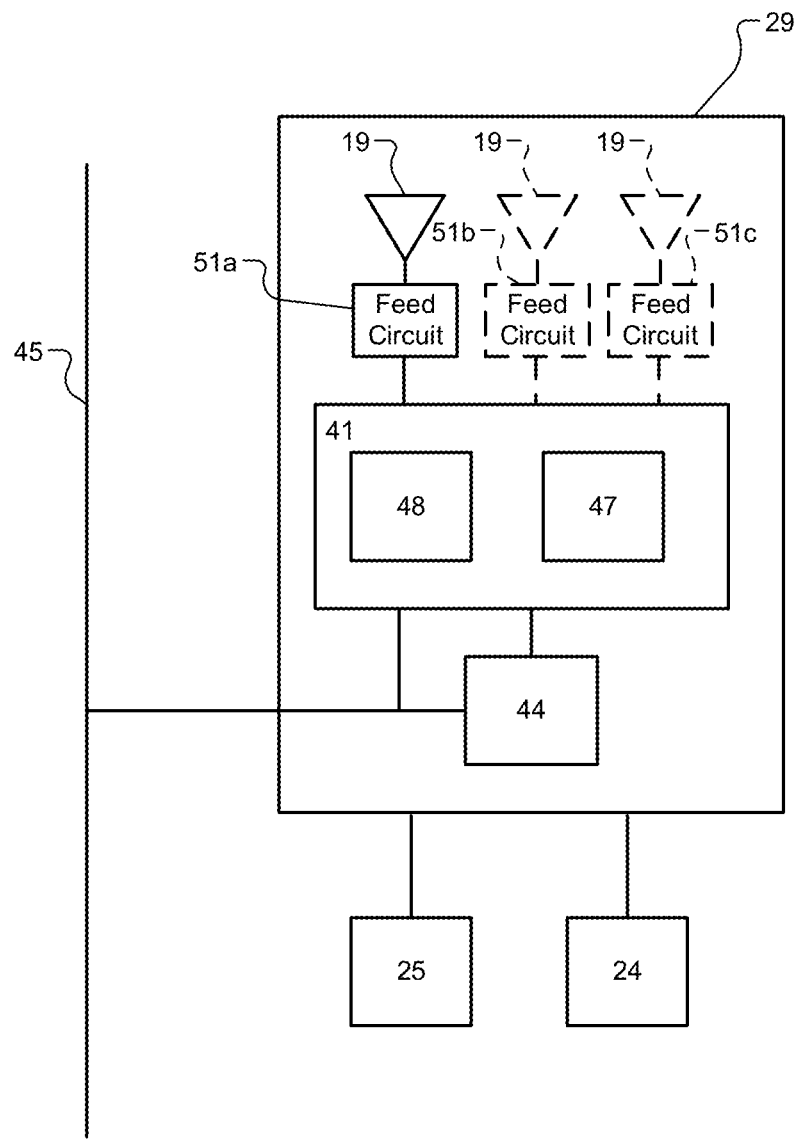
FIG. 4 is a functional block diagram of a communication gateway of a vehicle implementing feed circuits according to the present disclosure.

With reference to FIG. 4, the communication gateway 29 includes the wireless communication chipset 41 connected to the antennas 19 by feed circuits 51a-c to receive BLE signals. The feed circuits 51 may be configured similarly as any of the feed circuits disclosed herein. When the BLE communication protocol is used, the wireless communication chipset 41 implements a Bluetooth protocol stack 48 that is, for example, compliant with the BLE specification (i.e., Bluetooth Specification version 5.0). The wireless communication chipset 41 may also include an application 47 implemented by application code that is executable by a processor of the wireless communication chipset 41. Additionally or alternatively, the application 47 may be executable by a processor of the control module 20 and may be stored in a non-transitory computer-readable medium of the control module 20.

The application 47 may include code corresponding to modifications outside of the Bluetooth specification to enable the wireless communication chipset 41 to inspect 2222222222timestamped data transmitted and received by the wireless communication chipset 41, regardless of the validity of the data. For example, the application 47 enables the wireless communication chipset 41 to compare transmitted and received data against expectations. The communication gateway 29 is configured to transmit the actual transmitted and received data to the various modules of the control module 20 via the vehicle interface 45. Alternatively, the communication gateway 29 may be configured to receive the data from each of the sensors 31 via the vehicle interface 45. The application 47 may be further configured to enable the wireless communication chipset 41 to confirm that each of the sensors 31 has received the correct data at the correct time.

The Bluetooth protocol stack 48 is configured to provide the channel map, access identifier, next channel, and the time to the next channel to the application 47. The Bluetooth protocol stack 48 is configured to output timing signals for the timestamps of transmission and reception events to the application 47 and/or a digital PIN output of the wireless communication chipset 41. The communication gateway 29 also includes a timing synchronization module 44, which is configured to accept the timing signals and works in conjunction with the vehicle interface 45 to create accurate time stamps of connection information messages and other communications.

With continued reference to FIG. 4, the communication gateway 29 may provide timing information and channel map information to the timing control module 25 and, respectively. The communication gateway 29 may be configured to provide information corresponding to ongoing connections to the connection information distribution module 24 and timing signals to the timing control modules 25 so that the sensors 31 can find and follow, or eavesdrop on, the communication link 50.

Figure 5:
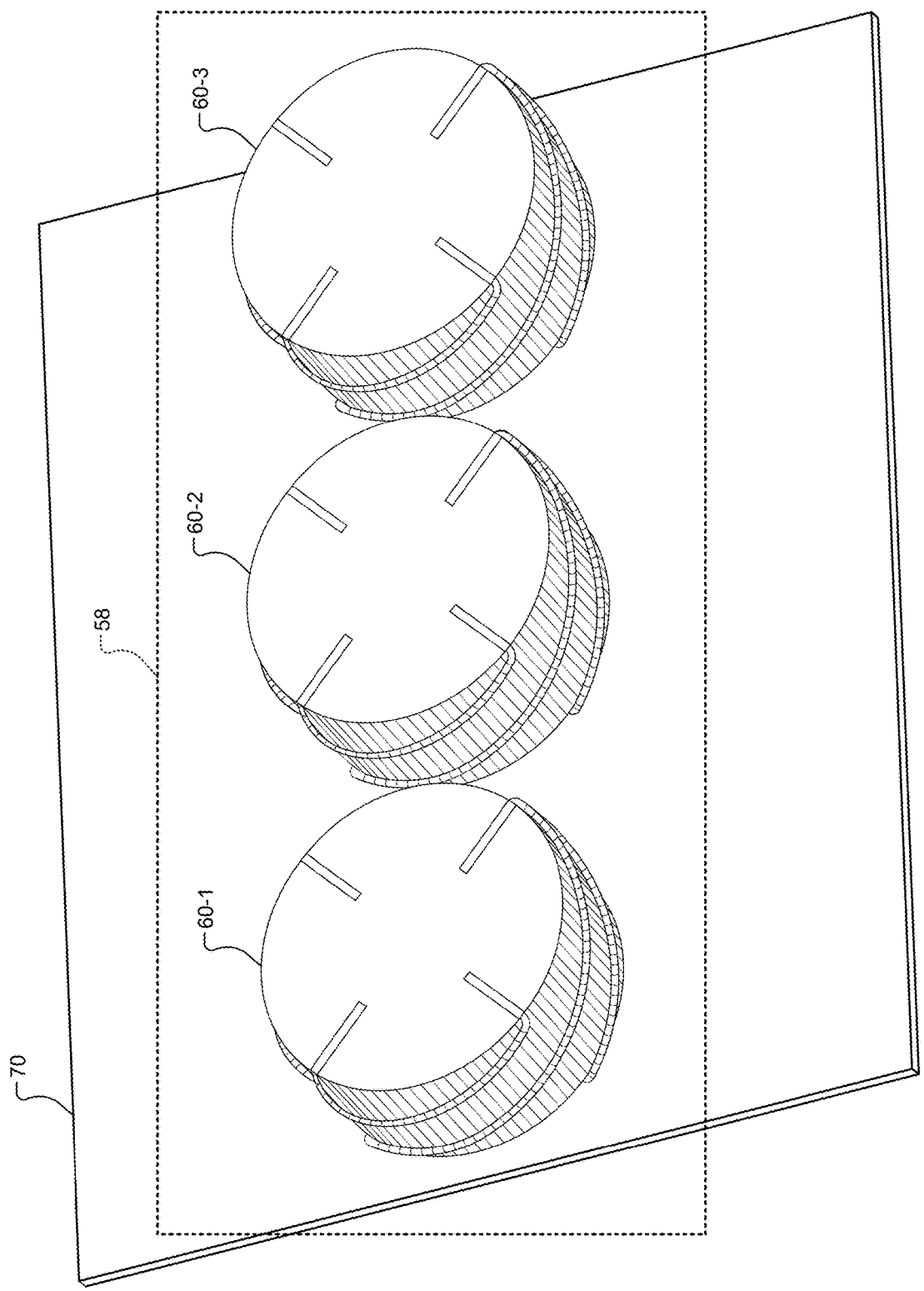
FIG. 5 is an illustration of an example antenna system in accordance with an embodiment of the present disclosure.

With reference to FIG. 5, an example illustration of an antenna system 58 is shown. The antenna system 58 may be configured or programmed to exchange RSSIs, angle-of-departure-transmission values, angle-of-arrival-reception values, round trip time of flight values, and/or carrier phase based ranging information. While this embodiment illustrates three antennas 60, any number of antennas may be included in the antenna system 58. While this embodiment illustrates three antennas 60 arranged linearly, the antennas 60 may be arranged in other configurations, such as in a triangle. Alternatively, two antennas 60 may be arranged. Alternatively, four antennas 60 may be used and may be arranged, for example, linearly or in a diamond configuration. The antennas 60 may be capacitively coupled to a ground plane 70 of a printed circuit board (PCB) that has multiple layers.

In one embodiment, the antennas 60 are circularly polarized, thereby enabling the PCB or the control module 20 in communication with the PCB to, for example, accurately determine an angle of arrival of the communication link 50 relative to the respective sensor 31. Furthermore, circular polarization enables strong direct links between the portable device 10 and the antennas 60 that have less portable device orientation variation in RSSI, angle of arrival, round trip time of flight distance, and carrier phase based ranging distance measurements.

The antennas 60 may have a large gain pattern in a first direction and a lower gain pattern in each of the remaining directions. Furthermore, the large gain pattern and the lower gain patterns may each be approximately uniform. Additionally, the large gain pattern may be associated with a front lobe and one of the lower gain patterns may be associated with a back lobe, where the front lobe and the back lobe are approximately symmetric and have a front-to-back gain ratio that is greater than 1. As an example, the antennas 60 may each have a front lobe with a large and approximately uniform gain value from 90° to −90° passing through 0°, and a back lobe with a smaller and approximately uniform gain value from 90° to −90° passing through 180°. By implementing antennas 60 that have a large front-to-back gain ratio, the antenna system 58 prevents coupling effects of the antennas 60 from affecting the transmit/receive characteristics of the sensors 31. Furthermore, by implementing antennas 60 that have a large front-to-back gain ratio, the antenna system 58 provides a reflection-free environment and, as such, reflections, multipath fading diffraction, refraction, and other sources of amplitude shifting noise sources are either negligible or non-existent.

Furthermore, the antennas 60 may have a large half-power beam width (i.e., 3 dB angular width), thereby enabling the antenna system 58 to accurately receive signals along an edge of the antenna system 58, such as ±90° from bore sight.

The antennas 60 may also be physically coupled to a central location of the ground plane 70. As an example, a center point of each of the antennas 60 may form a first line that is parallel to a second line that includes a center point of the ground plane 70. As such, the control module 20 can accurately determine the angle of arrival of the communication link 50 based on the antenna system 58 being able to provide optimal phase angle difference patterns that are not impacted by the orientation of the portable device 10.

In other embodiments, the antennas 60 may not be physically coupled to the central location of the ground plane 70 (i.e., near the top or bottom of the ground plane 70). Furthermore, while the antennas 60 are shown in a straight line along the center of the ground plane 70, in other embodiments, one or more of the antennas 60 may not be located along the center of the ground plane 70. Additionally, one or more of the antennas 60 may be elevated with respect to the remaining antennas 60 and/or the ground plane 70.

With reference to FIGS. 6A-6B, detailed illustrations of the antenna 60 are shown. The antenna 60 may include a body 80, which includes a top surface 80A, a lateral surface 80B, and a bottom surface 80C (shown in FIGS. 7C and 7D), and antenna elements 90, 92, 94, 96. In some embodiments, the body 80 may include an aperture 100 extending through a middle portion of the body 80, as shown in FIG. 6B. The body 80 may be implemented by a strong electrical insulator, such as a ceramic-infused plastic. The body 80 is described below in further detail with reference to FIGS. 7A-7D.

The antenna elements 90, 92, 94, 96 are configured to transmit and/or receive radio frequency (RF) signals, such as BLE signals, Wi-Fi signals, and/or Wi-Fi direct signals. The antenna elements 90, 92, 94, 96 may include, for example, a copper wire, transmission line, or other similar conductive material. Additionally, the antenna elements 90, 92, 94, 96 are disposed along each surface of the body 80. As described below in further detail with reference to FIGS. 7A-7D and 8, the antenna elements 90, 92, 94, 96 may each be disposed along a respective pathway (e.g., a slot, a structural protrusion, a designated surface, etc.) of the body 80.

Figure 7A:
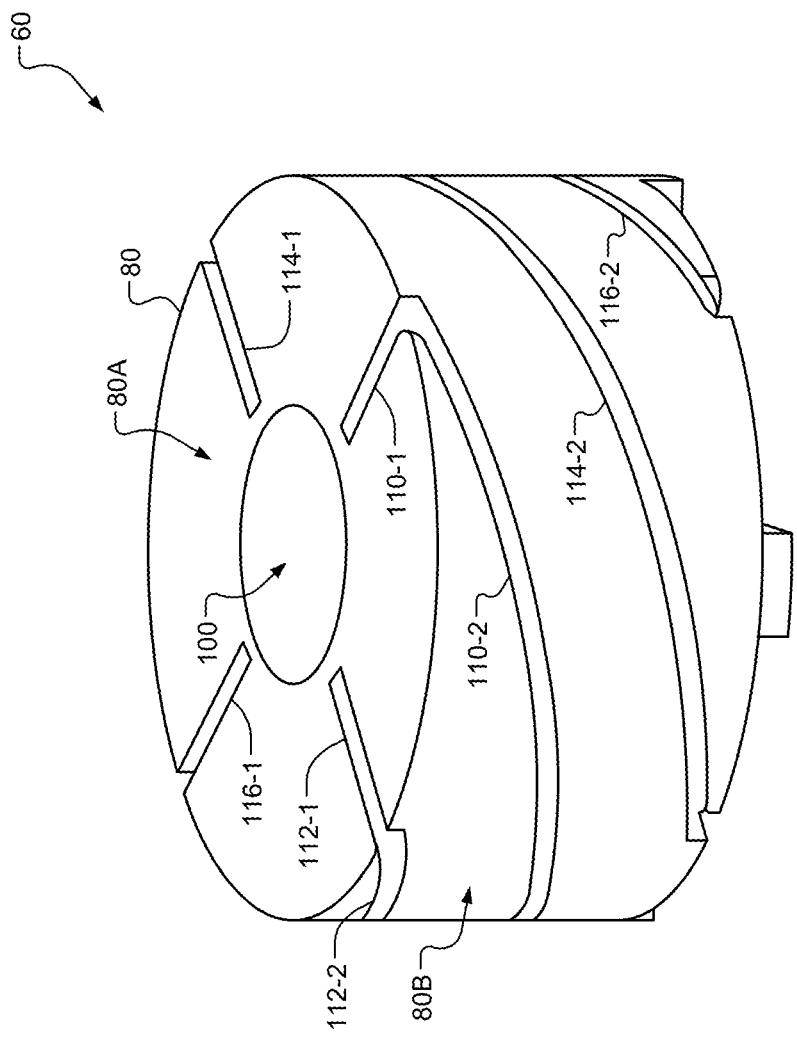
Figure 7B:
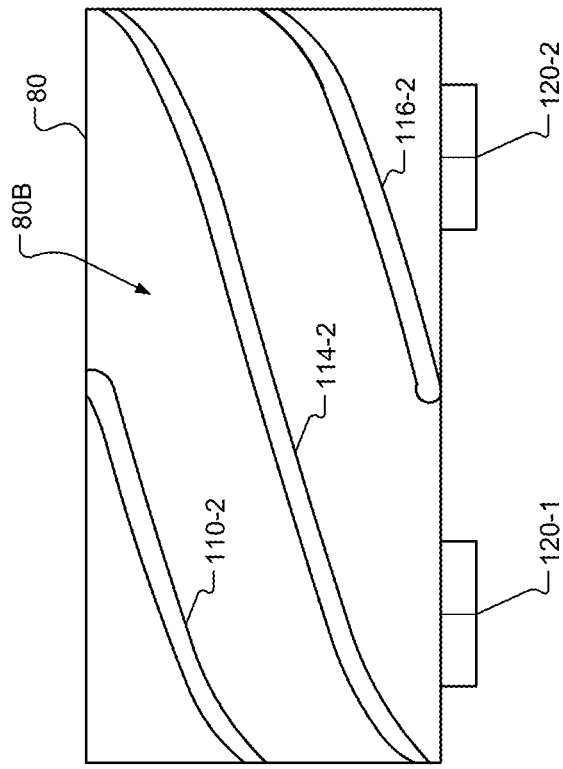

With reference to FIGS. 7A-7B, detailed illustrations of the body 80 are shown. In an embodiment, the body 80 includes pathways 110, 112, 114, 116, which are each configured to receive one of the antenna elements 90, 92, 94, 96. In one embodiment, the pathways 110, 112, 114, 116 may be formed using a milling tool or using a laser engraving process.

Furthermore, pathway 110 includes a first portion 110-1 located on the top surface 80A and a second portion 110-2 located on the lateral surface 80B; pathway 112 includes a first portion 112-1 located on the top surface 80A and a second portion 112-2 located on the lateral surface 80B; pathway 114 includes a first portion 114-1 located on the top surface 80A and a second portion 114-2 located on the lateral surface 80B; and pathway 116 includes a first portion 116-1 located on the top surface 80A and a second portion 116-2 located on the lateral surface 80B. Furthermore, the pathways 110, 112, 114, 116 may form a helical shape along at least one surface of the body 80. Additionally, the body 80 includes mounting elements 120-1, 120-2 that are configured to physically couple the body 80 to the PCB (not shown).

Figure 7D:
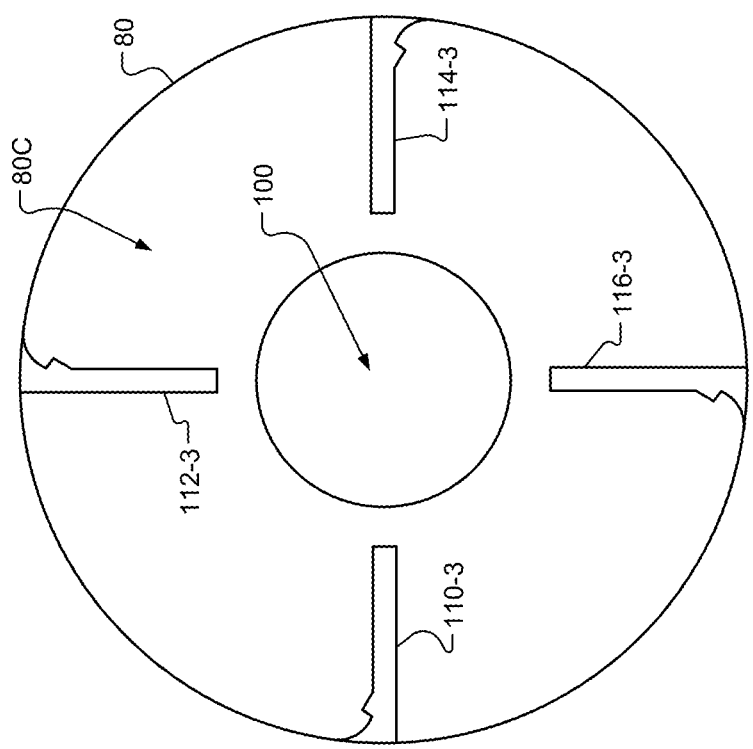

With reference to FIGS. 7C-7D, additional detailed illustrations of the bottom surface 80C of the body 80 are shown. Mounting elements 120-1, 120-2, 120-3, 120-4 (collectively referred to as mounting elements 120) are attached to the bottom surface 80C and, as described above, are configured to physically couple the body 80 to the PCB (not shown). Additionally, pathway 110 includes a third portion 110-3 located on the bottom surface 80C; pathway 112 includes a third portion 112-3 located on the bottom surface 80C; pathway 114 includes a third portion 114-3 located on the bottom surface 80C; and pathway 116 includes a third portion 116-3 located on the bottom surface 80C.

Figure 9:
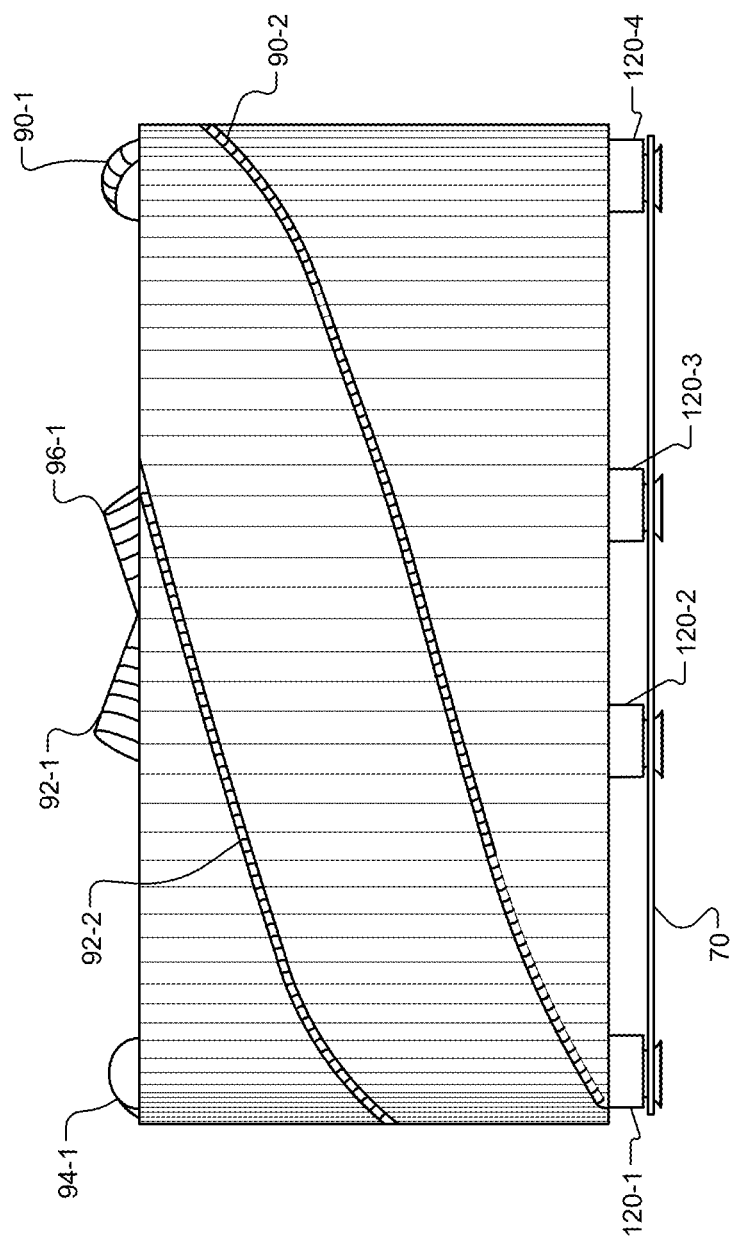

With reference to FIGS. 8-9, detailed illustrations of the antenna elements 90, 92, 94, 96 are shown. Antenna element 90 includes a first portion 90-1, a second portion 90-2, and a third portion 90-3; antenna element 92 includes a first portion 92-1, a second portion 92-2, and a third portion 92-3; antenna element 94 includes a first portion 94-1, a second portion 94-2, and a third portion 94-3; and antenna element 96 includes a first portion 96-1, a second portion 96-2, and a third portion 96-3.

In one embodiment, the first portions 90-1, 92-1, 94-1, 96-1 of the respective antenna elements 90, 92, 94, 96 are disposed in the first portions 110-1, 112-1, 114-1, 116-1 of respective pathways 110, 112, 114, 116. As an example, the first portions 90-1, 92-1, 94-1, 96-1 of the respective antenna elements 90, 92, 94, 96 may be bent such that they are entirely disposed within the first portions 110-1, 112-1, 114-1, 116-1 of respective pathways 110, 112, 114, 116. In other embodiments, the first portions 90-1, 92-1, 94-1, 96-1 of the respective antenna elements 90, 92, 94, 96 may be bent such that they are not entirely disposed within the first portions 110-1, 112-1, 114-1, 116-1 of respective pathways 110, 112, 114, 116, as shown in FIG. 9. The first portions 90-1, 92-1, 94-1, 96-1 of the antenna elements 90, 92, 94, 96 may also be implemented by capacitive top-loaded components that provides a capacitive load, thereby decreasing the size of the antenna 60.

The second portions 90-2, 92-2, 94-2, 96-2 of the respective antenna elements 90, 92, 94, 96 are disposed in the second portions 110-2, 112-2, 114-2, 116-2 of respective pathways 110, 112, 114, 116. As an example, the second portions 90-2, 92-2, 94-2, 96-2 of the respective antenna elements 90, 92, 94, 96 may be entirely disposed within the second portions 110-2, 112-2, 114-2, 116-2 of respective pathways 110, 112, 114, 116.

Figure 10:
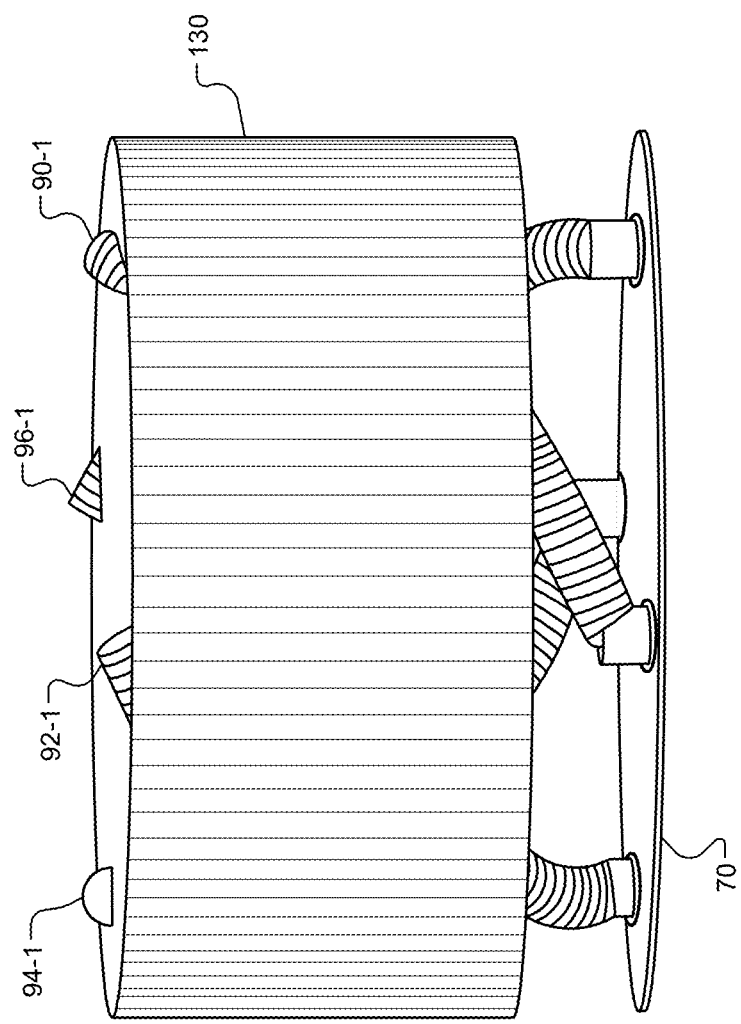
FIGS. 10-12 are illustrations of an encasing element of an antenna in accordance with an embodiment of the present disclosure.

The third portions 90-3, 92-3, 94-3, 96-3 of the respective antenna elements 90, 92, 94, 96 are disposed in the third portions 110-3, 112-3, 114-3, 116-3 of respective pathways 110, 112, 114, 116. As an example, the third portions 90-3, 92-3, 94-3, 96-3 of the respective antenna elements 90, 92, 94, 96 may be bent such that they are entirely disposed within the third portions 110-3, 112-3, 114-3, 116-3 of respective pathways 110, 112, 114, 116. Additionally, the third portions 90-3, 92-3, 94-3, 96-3 of the respective antenna elements 90, 92, 94, 96 may be capacitively coupled to the ground plane 70 via a conductive element, such as copper. In other embodiments, the third portions 90-3, 92-3, 94-3, 96-3 of the respective antenna elements 90, 92, 94, 96 may be bent such that they are not entirely disposed within the third portions 110-3, 112-3, 114-3, 116-3 of respective pathways 110, 112, 114, 116, as shown in FIG. 10.

The third portions 90-3, 92-3, 94-3, 96-3 of the antenna elements 90, 92, 94, 96 may be configured to execute an impedance matching function. As an example, the third portions 90-3, 92-3, 94-3, 96-3 may be implemented by a transmission line having a length associated with a quarter-wavelength of the antenna and a predefined impedance in order to match the impedance of the source (i.e., the first and second portions of the antenna elements 90, 92, 94, 96) to the impedance of the load (i.e., the third portions 90-3, 92-3, 94-3, 96-3 of the antenna elements 90, 92, 94, 96) at a frequency associated with the BLE signals (2.4 GHz).

In other embodiments, the third portions 90-3, 92-3, 94-3, 96-3 may include a transformer that is configured to isolate a balanced source impedance of the first and second portions of the antenna elements 90, 92, 94, 96 with an unbalanced load impedance of the third portions 90-3, 92-3, 94-3, 96-3. Specifically, the third portions 90-3, 92-3, 94-3, 96-3 may each include or be connected to a balun and/or other impedance matching circuit elements that match the impedance of the third portions 90-3, 92-3, 94-3, 96-3 with the impedance of the first and/or second portions of the antenna elements 90, 92, 94, 96.

Additionally or alternatively, the third portions 90-3, 92-3, 94-3, 96-3 may include a filtering circuit for matching the impedances, such as a resistor-inductor-capacitor (RLC) network, an inductor-capacitor (LC) network, and other similar filtering circuits. As a more specific example, the third portions 90-3, 92-3, 94-3, 96-3 may include one of an L-network, a T-network, or a π-network LC circuit. Moreover, the inductors, resistors, and/or capacitors of the filtering circuits may be selected and arranged such that a resonant frequency of the antennas 60 corresponds to the frequency of the BLE signals (2.4 GHz).

With continued reference to FIG. 9, the body 80 and the ground plane 70 may cooperate to define an air gap. The air gap may be configured to decrease the capacitance of the third portions 90-3, 92-3, 94-3, 96-3 of the antenna elements 90, 92, 94, 96. In other embodiments, the mounting elements 120 may be removed and, as such, the body 80 may be substantially flush to the ground plane 70 or other layer of the PCB.

Figure 11:
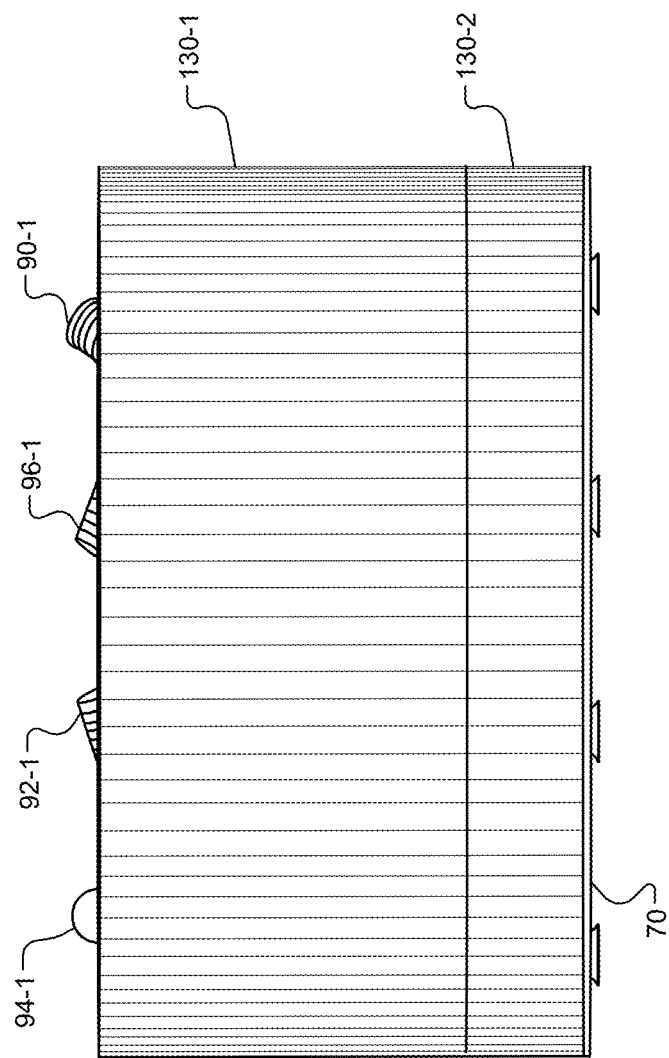
Figure 12:
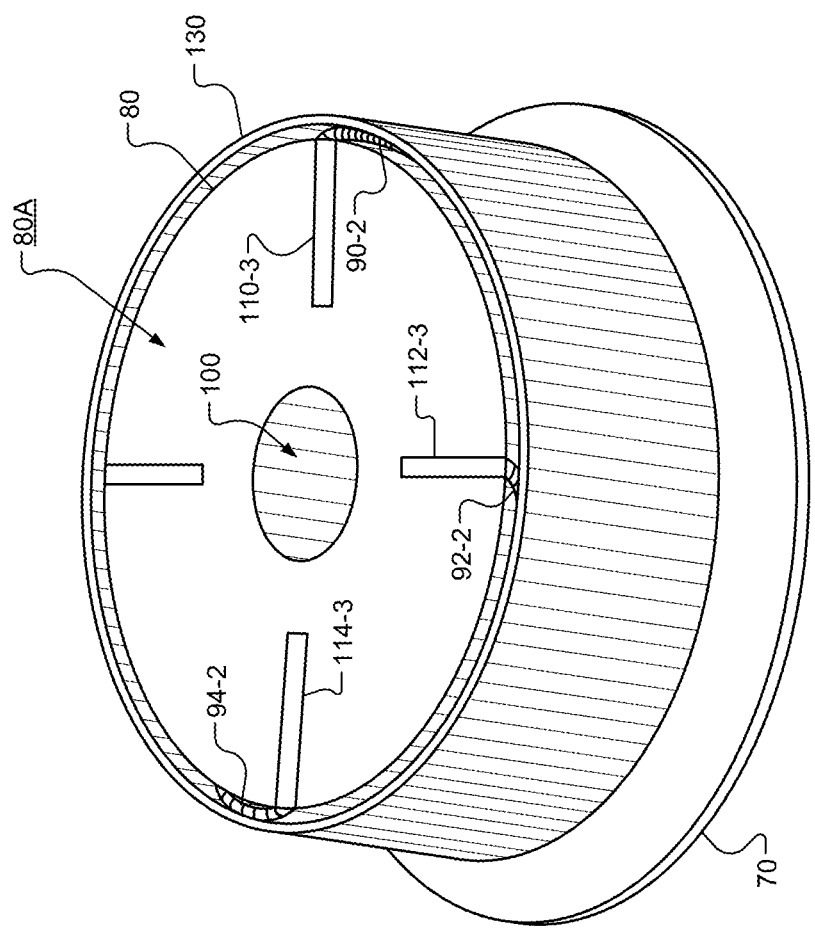

With reference to FIGS. 10-12, example illustrations of encasing element 130 are shown. In one embodiment, the encasing element 130 is physically coupled to the lateral surface 80B of the body 80 and is configured to encase the antenna elements 90, 92, 94, 96, as shown in FIG. 10. In other embodiments, the encasing element 130, which is shown as encasing elements 130-1, 130-2 in FIG. 11, is physically coupled to the lateral surface 80B of the body 80 and is configured to encase both the antenna elements 90, 92, 94, 96 and the air gap between the ground plane 70 and the body 80. In some embodiments, the encasing element 130 and the body 80 may cooperate to define an air gap therebetween, as shown in FIG. 12. As an example, the encasing element 130 may be implemented by a dielectric material having a high dielectric constant (e.g., c 10).

Figure 13:
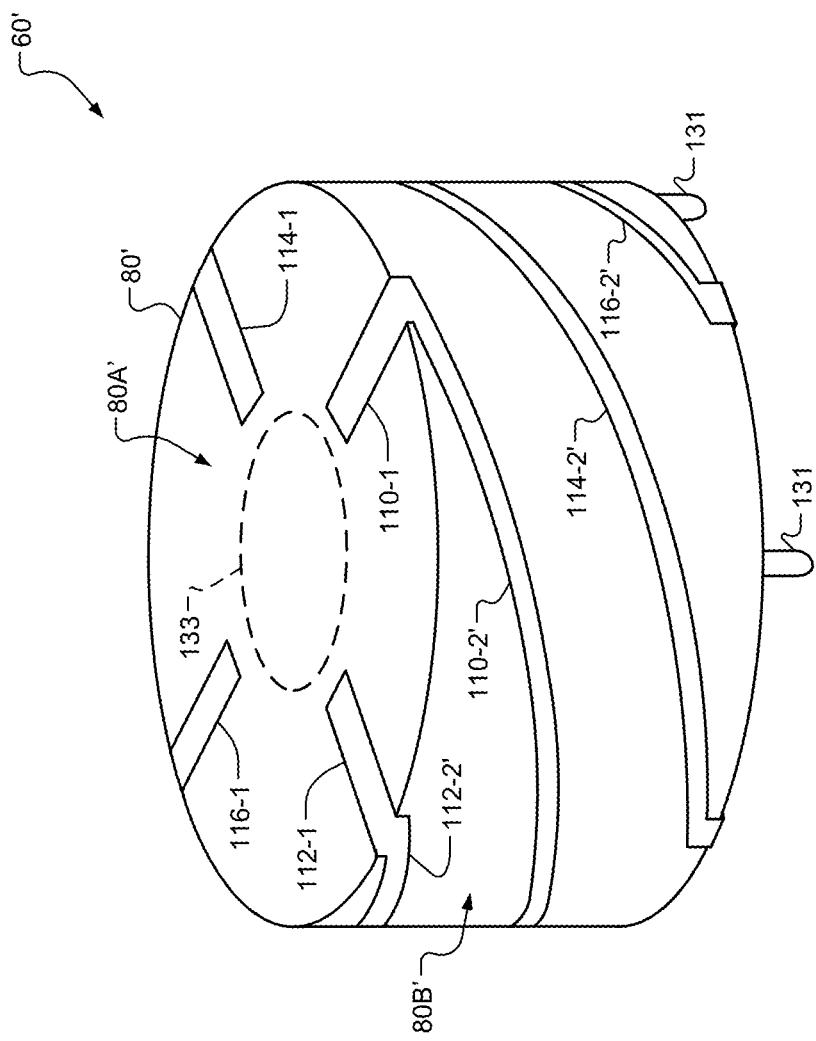
FIGS. 13-14 are illustrations of an antenna in accordance with an embodiment of the present disclosure.
Figure 14:
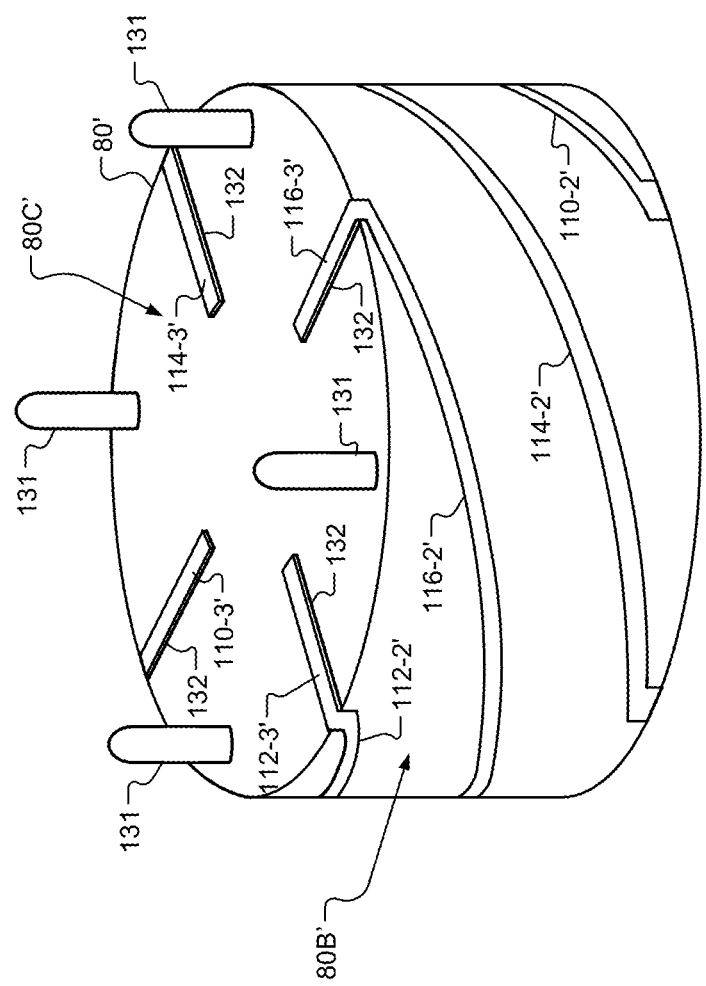

With reference to FIGS. 13-14, an antenna 60' is shown including an antenna body 80' that includes a top surface 80A', a lateral side surface 80B' and a bottom surface 80C'. The antenna 60' is similar to the antenna 60 of FIGS. 7A-7C, but does not include slots, includes heat stakes 131, and antenna element supporting protrusions 132. The protrusions 132 may be integrally formed as part of the antenna body 80'. The antenna body 80' may include a centrally located recessed notch (or indentation) 133. In one embodiment, a centrally located hole (e.g., a counter sunk hole) is provided instead of the recessed notch 133. The recessed notch 133 may be centered on the top surface 80A' or bottom surface 80C' to minimize signal disturbance. The recessed notch 133 may be positioned, sized and shaped for maximum RF performance and may be an artifact of a gate in an injection molding process of the antenna body 80'. The heat stakes 131 may be formed of injection molded plastic.

The antennas include antenna elements 110-1', 112-1', 114-1', 116-1', 110-2', 112-2', 114-2', 116-2', 110-3', 112-3', 114-3', 116-3', which are on corresponding sides 80A'-80C'. The antenna elements 110-1', 112-1', 114-1', 116-1', 110-2', 112-2', 114-2', 116-2', 110-3', 112-3', 114-3', 116-3' may be surface deposited traces (or electrodes). The thickness of the protrusions 132 are used to adjust distances between the antenna elements 110-3', 112-3', 114-3', 116-3' and a ground plane in a corresponding printed circuit board. These distances may be adjusted to adjust parasitic capacitance between the antenna elements and the ground plane and to provide improved power transfer the antenna 60'.

FIG. 15 shows an example of a portion 134 of a printed circuit board and a portion 135 of an antenna having an antenna body 136. The antenna body 136 includes antenna element supporting protrusions (e.g., the antenna element supporting protrusion 137), similar to the antenna element supporting protrusions 132 of FIG. 14. The printed circuit board 134 includes multiple layers including a first dielectric layer 138, a second dielectric layer 139, a ground plane layer 140, a third dielectric layer 141, a conductive layer 142, and other layers 143. The other layers 143 may include other conductive, signal, ground, component, and dielectric layers, at least some of which are further described below. This stack up of layers is provided as an example, the layers may be stacked differently and one or more intermediate layers may be disposed between each adjacent pair of layers shown.

An antenna element 144 is disposed on a bottom surface of the antenna element support protrusion 132 and is in contact with a conductive pad 145 via, for example, a conductive paste 146. The conductive pad may be flush with a top surface 147 of the printed circuit board as shown or may be surface mounted on the top surface 147. The conductive pad 145 is connected to the conductive layer 142 via an interconnecting element 148, which extends through an opening 149 of the ground plane layer 140. A parasitic capacitance exists between the antenna element 144 and the ground plane layer 140. This may be the case for other antenna elements mounted on antenna element supporting protrusions of the antenna body 136.

The antenna body 136 includes heat stakes (one heat stake 151 is shown). The heat stakes extend through respective holes in the printed circuit board. Bottom ends of the heat stakes are heated and melted (one melted end 153 of the heat state 152 is shown) to lock the heat stake to the printed circuit board.

Figure 16A:
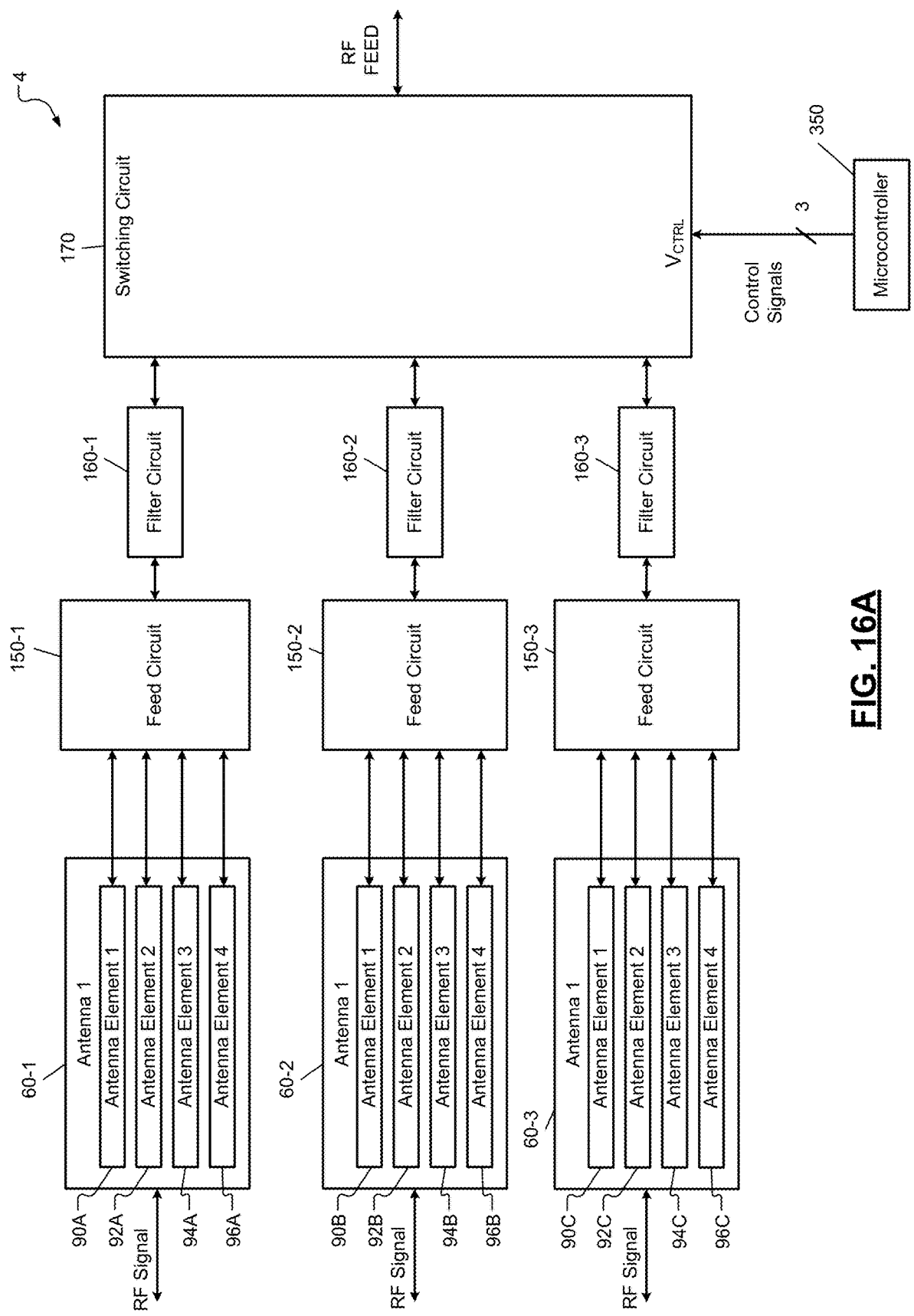
FIGS. 16A-16B is an illustration of another example angle of arrival measurement system in accordance with an embodiment of the present disclosure.
Figure 16B:
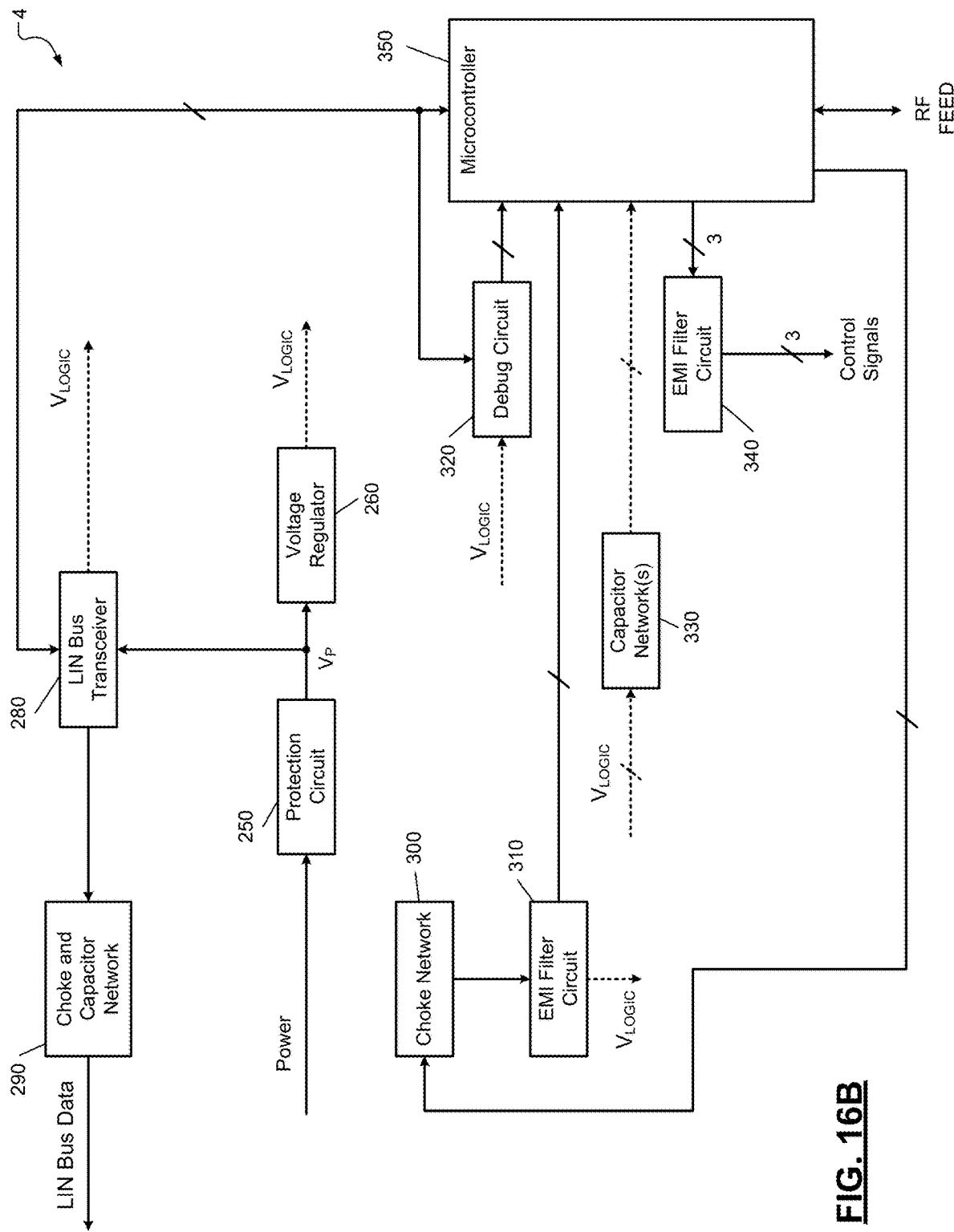

FIGS. 16A and 16B (collectively FIG. 16) show an example electronics system 4 is configured to determine an angle of arrival of the communication link 50 of FIG. 2. The electronics system 4 may include, for example, the antennas 60 or 60' and corresponding antenna elements 90A-C, 92A-C, 94A-C, 96A-C, feed circuits 150-1, 150-2, 150-3 (collectively referred to as feed circuits 150), filter circuits 160-1, 160-2, 160-3 (collectively referred to as filter circuits 160), and a switching circuit 170. In one embodiment, the feed circuits 150, the filter circuits 160, the switching circuit 170 and/or a portion or all of the microcontroller 350 may be disposed on a PCB, such as the PCB shown in FIG. 27.

As described above, each of the antennas 60 or 60' is configured to transmit and receive, at various phases (0°, 90°, 180°, and 270°, or 0°, −90°, −180°, and −270°), RF signals transmitted to and received from the portable device 10. The antenna elements of each of the antennas respectively transmit and receive signals at the different phases. As an example, antenna elements 90A, 92A, 94A, 96A may transmit and receive a RF signal at respective phases 0°, −90°, −180°, and −270°. The system 4 may include one or more (n) antenna elements per antenna and the feed circuits 150 have phase inputs at steps of 360°/n. The sign of phase and the definition of positive and negative phase and the right versus left handedness may be such that the antennas 60, 60' have greater gain towards the top surfaces of the antennas and smaller gain towards the bottom surfaces of the antennas.

In one embodiment, the feed circuits 150 include or are connected to respective impedance matching circuits. Each of the feed circuits 150 is configured to combine the RF signals received from the corresponding antenna elements and output a signal that has a phase difference of, for example, 90°. Reflections from signal mismatches may be provided to the ground plane via isolation ports of the feed circuits 150.

The feed circuits 150 are configured to provide the combined signals to the switching circuit 170 via the filter circuits 160, which may be configured to reject unwanted signals from out-of-band frequency ranges associated with the antennas 60, 60'. In one embodiment, the filter circuits 160 may be implemented by one or more decoupling capacitors. In one embodiment, the feed circuits 150 receive an input signal from each antenna element, phase shift the input signals by multiples of 360°/n, where n is the number of elements and additively combine the corresponding resultant radio frequency signals into a single output signals, which are provided to the filter circuits 160.

In response to receiving the signals from each of the feed circuits 150, the switching circuit 170 is configured to selectively output one of the signals. As an example, in response to providing a control signal (VCTRL) to a first control port of the switching circuit 170, the switching circuit 170 is configured to output the signal associated with antenna 60-1 to the control module 20. In response to providing the control signal to a second control port of the switching circuit 170, the switching circuit 170 is configured to output the signal associated with antenna 60-2 to the control module 20. Likewise, in response to providing the control signal to both the first and second control ports of the switching circuit 170, the switching circuit 170 is configured to output the signal associated with antenna 60-3 to the control module 20. In order to provide the control signals to the control ports of the switching circuit 170, a 2:3 transistor-transistor logic/complementary metal-oxide-semiconductor (2:3 TTL/CMOS) compatible decoder of the switching circuit 170 is configured to selectively activate two control ports of the switching circuit 170 that are electrically coupled to a control voltage generator circuit 220. The transceiver 21 may be a superheterodyne style receiver. The microprocessor configures the transceiver 21 and switches, such that the antennas 60, 60' receive a RF signal that is close to the phase lock loop (PLL) frequency, e.g., PLL+250 KHz In response to the control module 20 receiving one of the signals and sending the signal through an amplifier, a 0 degree (in-phase (I)) and 90 degree (quadrature-phase (Q)) mixer, a low pass filter, an in-phase and quadrature-phase analog-to-digital (ADC), and processing circuitry to down convert the intermediate frequency signal to a 0 Hz signal, where the processor receives IQ values of a +250 KHz sine wave.

The control module 20 is configured to determine a phase angle of the 0 Hz IF IQ signals the respective one of the antennas 60, 60' and at least one phase angle difference between the 0 Hz IF IQ signals of at least one pair of the antenna system 58. The phase angle refers to an angle between in-phase and quadrature-phase components of one of the signals received by the respective one of the antennas 60, 60' in the antenna system.

In order to determine the phase angle of the 0 Hz IF IQ signals and the at least one phase angle difference, the control module 20 may include one or more processors that are configured to execute instructions in a non-transitory computer readable memory, such as a RAM and/or ROM. Moreover, the control module 20 may be configured to determine the angle of arrival based on the at least one phase difference. The feed circuits 150, the filter circuits 160, and the switching circuit 170 may be disposed on the PCB.

The electronics system 4 generates the control signals (VCTRL) using a corresponding circuit topology and includes a microcontroller 350 that is configured to determine a phase angle of the 0 Hz IF IQ signals of the respective one of the antennas 60, 60' and at least one phase angle difference of the antenna system 58. In order to determine the phase angle of the 0 Hz IF IQ signals and the at least one phase angle difference, the microcontroller 350 may include one or more processors that are configured to execute instructions in a non-transitory computer readable memory, such as RAM and/or ROM. The instructions may include, for example, algorithms for converting the signals received from the switching circuit 170 (RF FEED) into a phase angle of the 0 Hz IF IQ signals and subsequently determining the at least one phase angle difference.

The electronics system 4 may also be configured to convert power received from a power source (e.g., a DC power source that outputs 12V) to a voltage level suitable for the microcontroller 350. In one embodiment, a protection circuit 250 receives power from the power source, and the protection circuit 250 is configured to suppress high frequency signals and noise. As an example, the protection circuit 250 may include a ferrite bead and bypass capacitor filter circuit.

A voltage regulator 260 receives a filtered power signal ($V_P$), which has a voltage value that is equal to the voltage value of the power supply, from the protection circuit 250.

The voltage regulator 260 converts the filtered power signal to a second logic signal ($V_{LOGIC}$) having a voltage value suitable for the microcontroller 350, such as 3.3 Volts. The voltage regulator 260 may be implemented by, for example, a voltage regulator IC or a buck converter circuit.

A LIN bus transceiver 280 may be configured to receive phase angle measurements from the microcontroller 350 and transmit them to the control module 20 via the LIN bus and choke and capacitor network 290. Additionally or alternatively, the LIN bus transceiver 280 may be configured to receive the at least one phase angle difference or at least one angle of arrival measurement(s) from the microcontroller 350 and transmit them to the control module 20 via the LIN bus and the choke and capacitor network 290. As an example, the choke and capacitor network 290 may include at least one ferrite bead and bypass capacitor filter and a Zener diode electrically coupled in parallel to the at least one ferrite bead and bypass capacitor filters. Additionally, the LIN bus transceiver 280 receives the filtered power signal from the protection circuit 250, and the LIN bus transceiver 280 may include a voltage regulator IC that converts the filtered power signal to the second logic signal ($V_{LOGIC}$).

A choke network 300 and an electromagnetic interference (EMI) filter circuit 310 are configured to suppress noise present in signals received from and/or transmitted to the microcontroller 350. The choke network 300 may be implemented by, for example, a plurality of ferrite beads. The EMI filter circuit 310 may be implemented by, for example, an integrated circuit that includes an EMI filter array.

A debug circuit 320 is configured to enable an operator to test the functionality of the various circuits of the PCB, such as the microcontroller 350. Additionally, the operator may update and/or load software of the microcontroller 350 via the debug circuit 320. The debug circuit 320 may include various interfaces for enabling the operator to test the functionality or update the software of the microcontroller 350, such as a joint test action group (JTAG) standard interface or a serial wire debug (SWD) standard interface.

The microcontroller 350 may be configured to receive the logic signal ($V_{LOGIC}$) at various ports of the microcontroller 350 via at least one capacitor network 330, which may be configured to prevent noise of the logic signal from damaging the microcontroller 350.

In some embodiments, the microcontroller 350 may include a Bluetooth transceiver circuit that enables the microcontroller 350 to communicate with peripheral devices via a Bluetooth communication link.

The microcontroller 350 may be configured to provide control signals to the switching circuit 170 via EMI filter circuit 340, which may be implemented by, for example, an integrated circuit that includes an EMI filter array. In response to receiving one of the control signals, the switching circuit 170 is configured to selectively output one of the signals received via the coupler circuits 150, as described above. As an example, in response to a first control signal being provided to the switching circuit 170, the switching circuit 170 is configured to output the signal associated with antenna 60-1 to the microcontroller 350. In response to a second control signal being provided to the switching circuit 170, the switching circuit 170 is configured to output the signal associated with antenna 60-2 to the microcontroller 350. Likewise, in response to a third control signal being provided to the switching circuit 170, the switching circuit 170 is configured to output the signal associated with antenna 60-3 to the microcontroller 350.

In response to the microcontroller 350 receiving one of the signals, the microcontroller 350 is configured to determine a phase angle of the 0 Hz IF IQ signals of the corresponding antenna 60 or 60' and at least one phase angle difference of the antenna system 58. Moreover, the microcontroller 350 may be configured to determine the angle of arrival based on the at least one phase difference.

Figure 17:
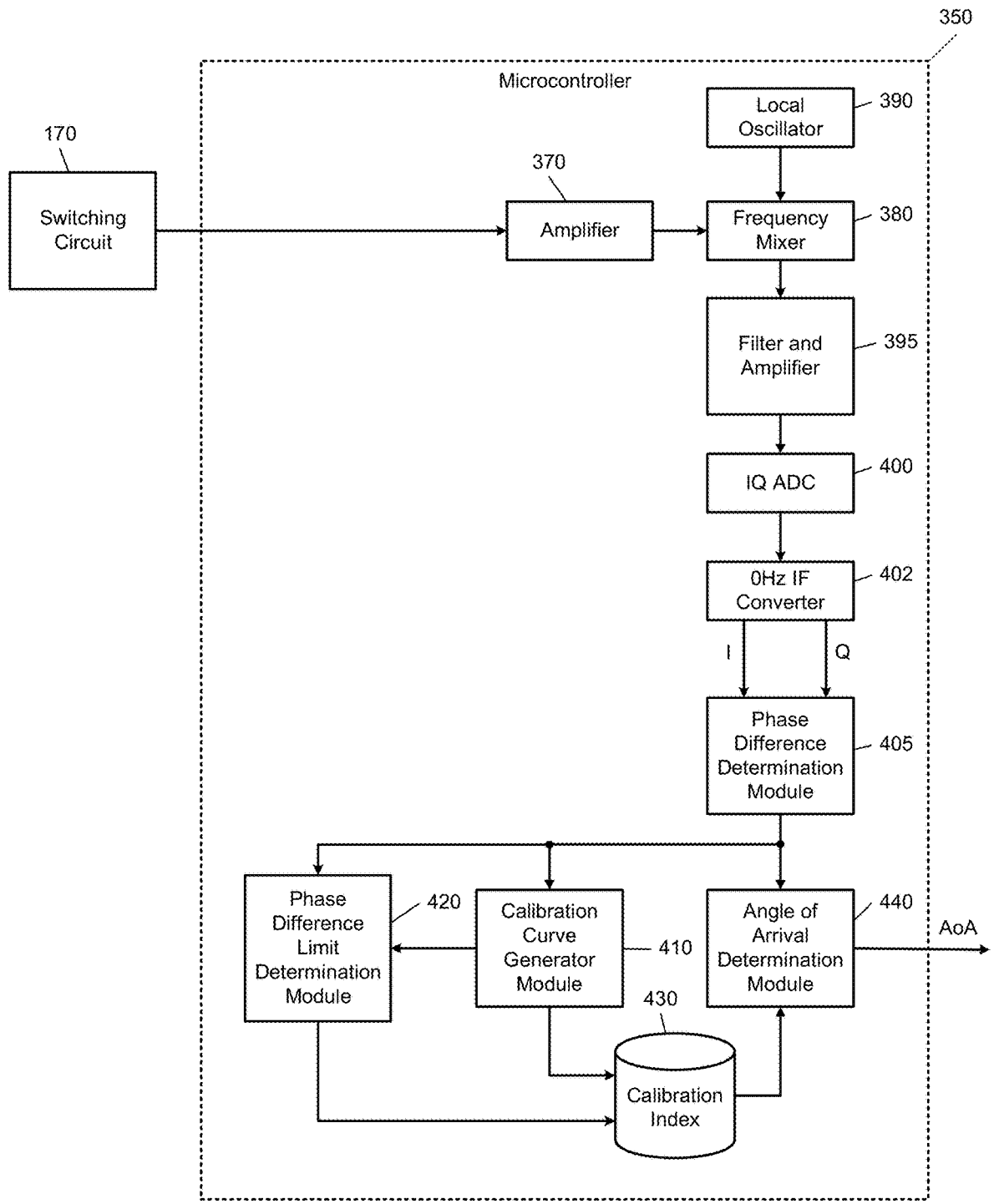
FIG. 17 is a functional block diagram of an example microcontroller in accordance with an embodiment of the present disclosure.
Figure 25:
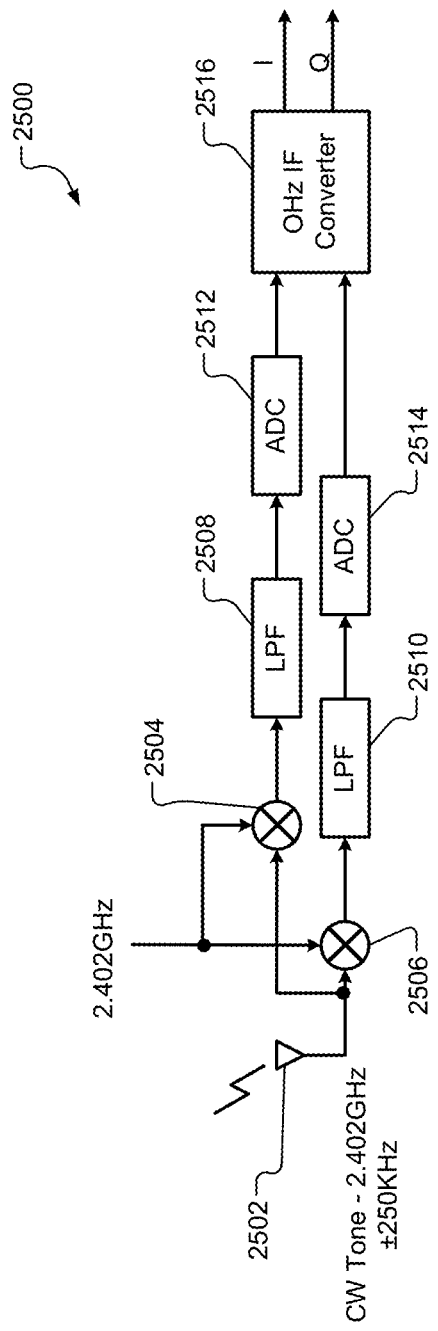
FIG. 25 is a functional block diagram of an example receiving circuit for determining a phase angle between in-phase and quadrature components of a radio frequency signal in accordance with an embodiment of the present disclosure.

With reference to FIG. 17, an example functional block diagram of the microcontroller 350 is shown. As described below in further detail, the microcontroller 350 is configured to determine an angle of arrival of the antenna system 58 based on one of the signals selectively outputted by the switching circuit 170. In one embodiment, the microcontroller 350 may include an amplifier 370, a frequency mixer 380, a local oscillator 390, a filter and amplifier 395, an IQ ADC 400, a 0 Hz intermediate frequency (IF) converter 402, a phase difference determination module 405, a calibration curve generator module 410, a phase angle difference limit determination module 420, a calibration index 430, and an angle of arrival determination module 440. The IQ ADC 400, the 0 Hz IF converter 402, the phase difference determination module 405, the calibration curve generator module 410, the phase angle difference limit determination module 420, and the angle of arrival determination module 440 may be implemented by one or more processors that are configured to execute instructions stored in a non-transitory computer readable medium, such as a RAM and/or ROM. An example of devices 380, 395, 400 and 402 is shown in FIG. 25 and further described below.

The amplifier 370 is configured to amplify the signals and may be implemented by, for example, an operational amplifier. The frequency mixer 380 is configured to receive the amplified signal from the amplifier 370 and a mixing signal from the local oscillator 390 in order to change the amplified signal into a new, intermediate signal. The filter and amplifier 395 may be configured to generate an analytic signal by amplifying the intermediate signal and limiting the frequencies of the intermediate signal to a certain bandwidth. In one embodiment, the filter and amplifier 395 are implemented by an operational amplifier and either a bandpass filter or a low pass filter. In another embodiment, the filter and amplifier 395 pass an intermediate frequency or set of frequencies when implemented as a bandpass filter. The filter and amplifier 395 may pass a low frequency or set of frequencies when implemented as a low pass filter.

As an example, the frequency mixer 380 receives the amplified signal, which has a frequency of, for example, 2.4 GHz-2.4835 GHz. The frequency mixer 380 receives the mixing signal from the local oscillator 390, which may be implemented by a phase-locked loop circuit, and mixes the amplified signal and the mixing signal in order to generate the intermediate signal. Subsequently, the filter and amplifier 395 may generate the analytic signal by amplifying the intermediate signal and limiting the frequencies of the intermediate signal to a certain bandwidth, such as 250 kHz.

The IQ ADC 400 is configured to convert the intermediate signal from an analog signal to a digital analytic signal. The 0 Hz IF converter 402 is configured to obtain a cosine component (i.e., in-phase component) and a sine component (i.e., quadrature-phase component) of the digital analytic signal. Subsequently, a phase angle difference determination module 405 is configured to determine a phase angle of the 0 Hz IF IQ signals of an antenna 60 (or 60') based on the cosine component (I or in-phase component) and the sine component (Q or quadrature-phase component). As a specific example, the phase angle difference determination module 405 may determine the phase angle by executing an arctangent function of an amplitude of the sine component and an amplitude of the cosine component. Furthermore, the phase angle difference determination module 405 may be configured to determine the phase angle difference between a pair of antennas 60 of the antenna system 58 based on the phase angle of each antenna of the pair of antennas 60. Determining the phase angle and the phase angle difference are described below in further detail with reference to FIGS. 18-19.

The phase difference determination module 405 is configured to determine the phase angle difference value between a pair of antennas 60 of the antenna system 58 (e.g., the phase angle difference value between an outer pair of antennas, such as antennas 60-1 and 60-3) for various locations of the portable device 10. As an example, the phase angle difference determination module 405 is configured to determine the phase angle difference between the pair of antennas 60 for each azimuth angle (i.e., 0°-360°) between the antenna system 58 and the portable device 10.

Additionally, the phase angle difference determination module 405 is configured to determine the phase angle difference value between a pair of antennas 60 (or 60') of the antenna system 58 for various communication channels of the portable device 10. As an example, the phase angle difference determination module 405 is configured to determine the phase angle difference between the pair of antennas 60 for each BLE communication channel.

The calibration curve generator module 410 is configured to generate a plurality of reference curves based on the information obtained by the phase difference determination module 405. As an example, the calibration curve generator 410 may be configured to generate a first reference curve associated with a first BLE communication channel, and the first reference curve may represent a measured phase angle difference of a pair of antennas 60 for each azimuth angle. Moreover, the calibration curve generator 410 may generate a reference curve for each BLE communication channel, where each of the additional reference curves represent a measured phase angle difference value of a pair of antennas 60 for each azimuth angle. Additionally, the calibration curve generator module 410 is configured to generate a calibration curve based on the first reference curve and at least one of the additional reference curves. Generating the reference curves and the calibration curve are described below in further detail with reference to FIGS. 18-19.

The phase difference limit determination module 420 is configured to generate a phase angle difference limit for each communication channel. As an example, the phase angle difference limits may be associated with a predefined distance from the bore sight of the antenna system 58 (e.g., phase angle difference value limits for a particular communication channel are defined as phase angle difference value on calibration curve at ±80° from bore sight). As another example, the phase angle difference limits may be determined based on the geometry of the reference curve for a particular communication channel. More specifically, the phase angle difference limits may be associated with a location on the reference curve in which the derivative of the reference curve changes by a predefined amount. The phase angle difference limit may be the same for each communication channel. In other embodiments, each communication channel may have different phase angle difference limits.

The calibration curve generator module 410 and the phase angle difference limit determination module 420 are configured to store the calibrated curve and the phase angle difference limits, respectively, in the calibration index 430. Using the calibration index 430 and the antenna pair phase angle differences, the angle of arrival determination module 440 is configured to determine the location of the portable device 10 by referencing the calibration curve and/or the phase angle difference limit of the respective channel. Using the phase angle difference and the communication channel, the respective angle of arrival determination modules 440 may reference the calibration curve and/or the phase angle difference limit associated with the first communication channel and determine the azimuth angle between the portable device 10 and the respective antenna 43. Using each of the azimuth angles obtained by each of the antennas 43, the control module 20 may be configured to determine the location of the portable device 10 relative to the vehicle 30.

Figure 18:
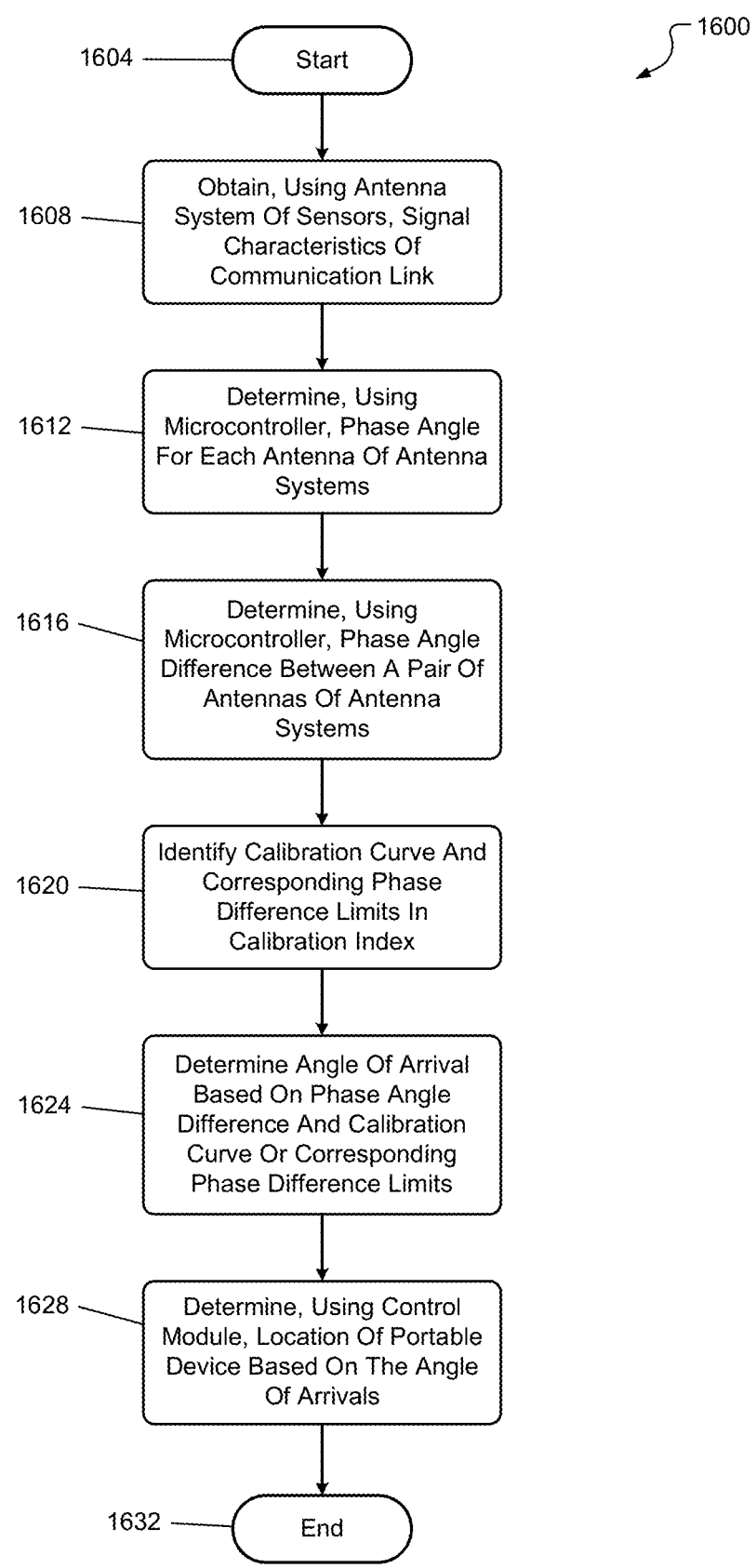
FIGS. 18-20 are flowcharts of example control algorithms in accordance with an embodiment of the present disclosure.

With reference to FIG. 18, a flowchart of a control algorithm 1600 for determining an angle of arrival of the communication link 50 and the location of the portable device 10 is shown. The control algorithm 1600 begins at 1604 when, for example, the portable device 10 is connected to and authorized to connect to the communication gateway 29. At 1608, the control algorithm 1600 obtains, using the antenna systems 58 of the sensors 31, signal characteristics of the communication link 50. At 1612, the control algorithm 1600 determines, using the microcontroller 350, a phase angle for each antenna 60 (or 60') of the antenna systems 58. At 1616, the control algorithm 1600 determines, using the microcontroller 350, a phase angle difference between a pair of antennas 60 of the antenna system 58. At 1620, the control algorithm 1600 identifies, using the microcontroller 350, the calibration curve and corresponding phase angle difference limits in the calibration index 410. As described above, the microcontroller 350 may identify the phase angle difference limits based on the communication channel or frequency of the communication link 50.

At 1624, the control algorithm 1600 determines, using the microcontroller 350, an angle of arrival of the portable device 10 based on (i) the determined phase angle difference and (ii) the calibration curve or corresponding phase angle difference limits. As an example, the microcontroller 350 may determine the angle of arrival by identifying an azimuth angle on the calibration curve that is associated with the determined phase angle difference. Alternatively, the microcontroller 350 may determine the angle of arrival by identifying an azimuth angle on the calibration curve associated with the phase angle difference limits that is associated with the determined phase angle difference and the communication channel of the communication link 50. The angle of arrival is based on, equal to and/or directly related to the azimuth angles determined. At 1628, the control algorithm 1600 determines, using the control module 20, the location of the portable device 10 relative to the vehicle 30 based on each of the angle of arrivals obtained by the sensors 31. At 1632, the control algorithm 1600 ends.

The control module 20 may, based on or in response to determined location of the portable device 10, unlock a vehicle door, provide access to a vehicle (e.g., the vehicle 30), open a window, permit starting of a vehicle, and/or perform some other task.

Figure 19:
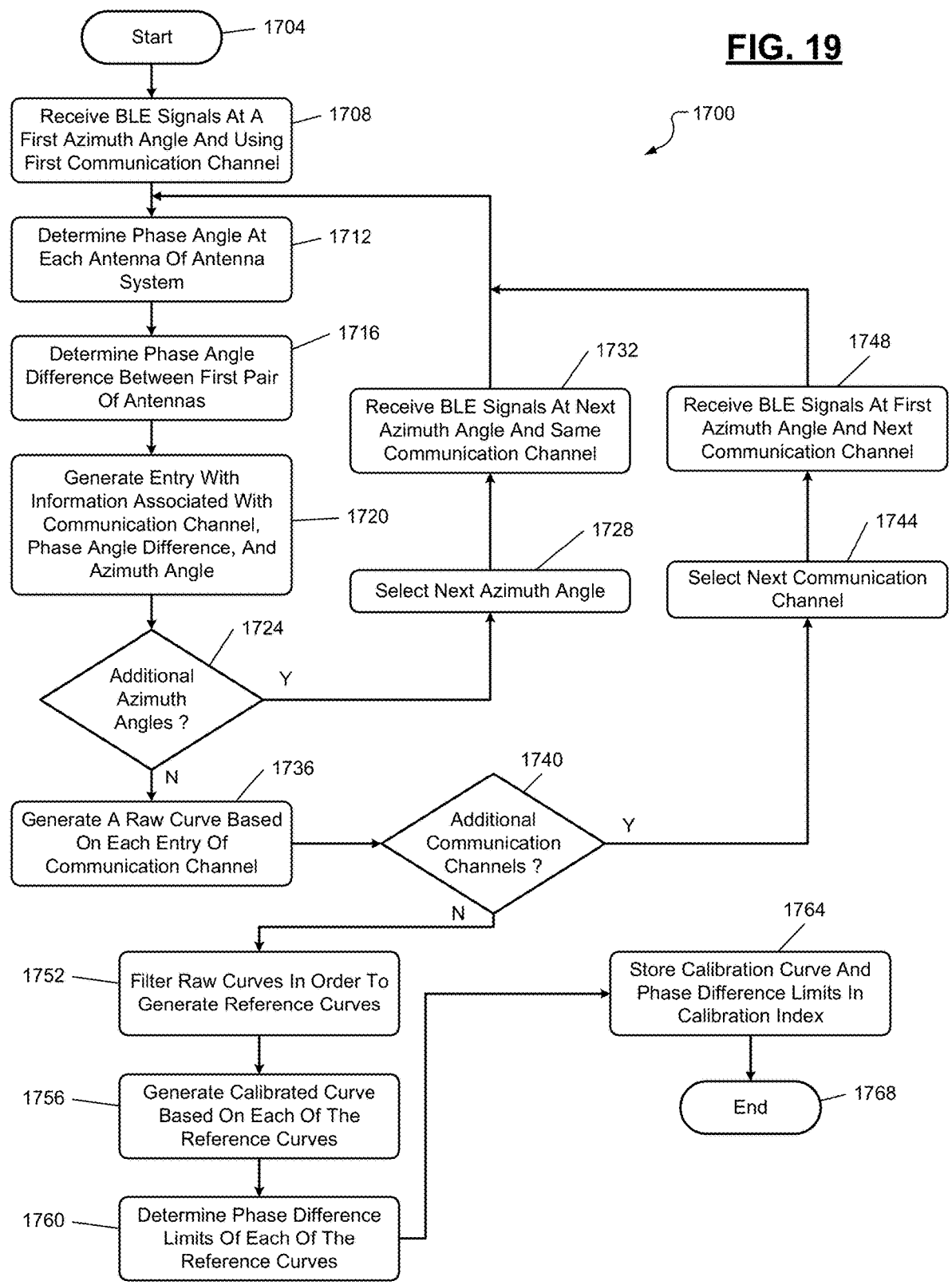

With reference to FIG. 19, a flowchart of a control algorithm 1700 for generating the calibration curve and determining the phase angle difference limits for each communication channel is shown. The control algorithm 1700 begins at 1704 when, for example, an operator turns on the portable device 10 and calibration of the electronics system 4 is initiated. At 1708, the control algorithm 1700 receives, using the antenna system 58, BLE signals at a first azimuth angle and using a first communication channel. At 1712, the control algorithm 1700 determines, using the microcontroller 350, the phase angle at each antenna 60 (or 60') of the antenna system 58. At 1716, the control algorithm 1700 determines a phase angle difference between a first pair of antennas 60 of the antenna system 58. At 1720, the control algorithm 1700 generates, using the microcontroller 350, an entry that includes information associated with the communication channel, the phase angle difference, and the azimuth angle.

At 1724, the control algorithm 1700 determines whether additional azimuth angles need to be tested for generating the raw curve. If so, the control algorithm 1700 proceeds to 1728; otherwise, the control algorithm 1700 proceeds to 1736. At 1728, the control algorithm 1700 selects the next azimuth angle and then proceeds to 1732. At 1732, the control algorithm 1700 receives, using the antenna system 58, BLE signals at the next azimuth angle and using the same communication channel and then proceeds to 1712.

At 1736, the control algorithm 1700 generates a raw curve based on each entry of the communication channel. At 1740, the control algorithm 1700 determines whether there are additional communication channels that need to be tested for generating the calibration curve. If so, the control algorithm 1700 proceeds to 1744; otherwise, the control algorithm 1700 proceeds to 1752. At 1744, the control algorithm 1700 selects the next communication channel and then proceeds to 1748. At 1748, the control algorithm 1700 receives, using the antenna system 58, BLE signals at the first azimuth angle and using the next communication channel and then proceeds to 1712.

At 1752, the control algorithm 1700 filters, using the microcontroller 350, the raw curves to generate the reference curves. As an example, the microcontroller 350 may be configured to apply a digital low-pass filter, such as an equiripple finite impulse response (FIR) low-pass filter, to the raw curves in order to generate the reference curves. At 1756, the control algorithm 1700 generates, using the microcontroller 350, the calibrated curve based on each of the reference curves. As an example, the calibrated curve may be generating by interpolating (e.g., averaging) each of the reference curves. At 1760, the control algorithm 1700 determines, using the microcontroller 350, the phase angle difference limits of each of the filtered curves, as described above with reference to FIG. 15. At 1764, the control algorithm 1700 stores, using the microcontroller 350, the calibration curve and phase angle difference limits for each communication channel in the calibration index 430 and then ends at 1768.

Figure 20:
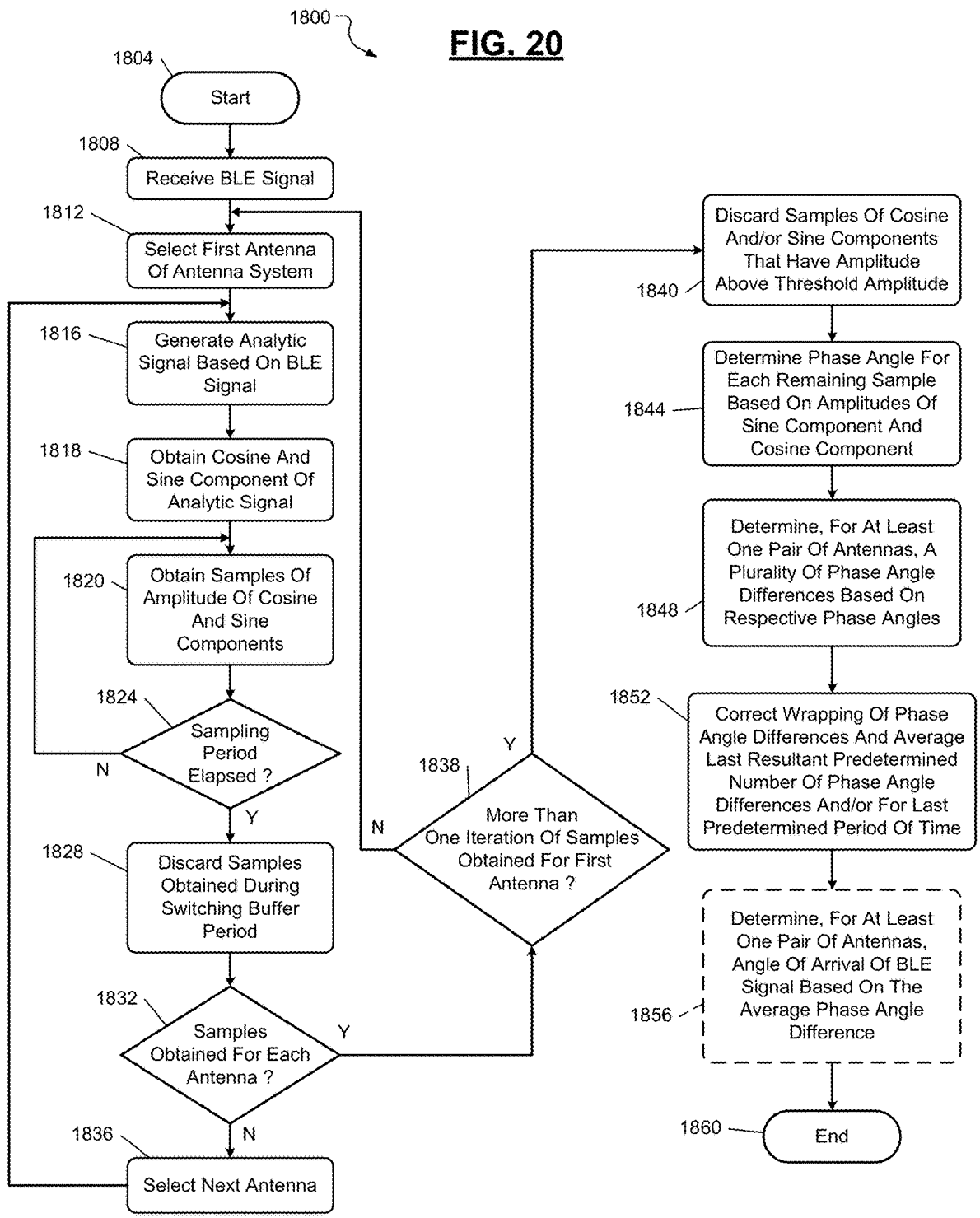

With reference to FIG. 20, a flowchart of a control algorithm 1800 for determining a phase angle difference between a pair of antennas 60 of the antenna system 58 is shown. The control algorithm 1800 begins at 1804 when, for example, control algorithm 1600 executes step 1616 or control algorithm 1700 executes step 1716 described above with reference to FIG. 18 and FIG. 19, respectively. At 1808, the control algorithm 1800 receives, using the antenna system 58, the BLE signal. At 1812, the control algorithm 1800 selects, using the switching circuit 170, the first antenna 60-1 of the antenna system 58. At 1816, the control algorithm 1800 generates, using the microcontroller 350, the analytic signal based on the BLE signal. At 1818, the control algorithm 1800 obtains, using the microcontroller 350, a cosine component and a sine component of the analytic signal. At 1820, the control algorithm 1800 obtains, using the microcontroller 350, samples of the amplitude of the cosine component and the sine component.

At 1824, the control algorithm 1800 determines, using the microcontroller 350, whether a sampling period has elapsed.

As an example, the sampling period may be associated with a switching rate of the switching circuit 170. In one embodiment, the switching rate may be 4 μs. If the sampling period has elapsed, the control algorithm 1800 proceeds to 1828; otherwise, the control algorithm 1800 proceeds to 1820. At 1828, the control algorithm 1800 discards, using the microcontroller 350, samples obtained during a switching period buffer period. The switching period buffer period may be associated with a switching delay of the switching circuit 170, and includes at least one of a turn-on delay period and a turn-off delay period of the switching circuit 170. At 1832, the control algorithm 1800 determines, using the microcontroller 350, whether amplitude samples were obtained for each antenna 60 of the antenna system 58. If so, the control algorithm 1800 proceeds to 1838; otherwise, the control algorithm 1800 proceeds to 1836, where the control algorithm 1800 selects the next antenna 60 and then proceeds to 1816.

At 1838, the control algorithm 1800 determines, using the microcontroller 350, whether more than one iteration of amplitude samples were obtained for the first antenna 60-1. If so, the control algorithm 1800 proceeds to 1840; otherwise, the control algorithm 1800 proceeds to 1812. At 1840, the control algorithm 1800 may discard, using the microcontroller 350, samples of cosine and/or sine components that have a magnitude that is too far from an average magnitude and/or above a predefined threshold value. At 1844, the control algorithm 1800 determines, using the microcontroller 350, a phase angle for each remaining sample based on amplitude of sine component and amplitude of corresponding cosine component. As an example, the phase difference determination module 405 may be configured to determine the phase angle by executing an arctangent function of an amplitude of a sine component and a corresponding amplitude of a cosine component.

At 1848, the control algorithm 1800 determines, for at least one pair of antennas 60 of the antenna system 58 and using the microcontroller 350, a plurality of phase angle differences based on the respective phase angles. As an example, during the sampling period and for the first antenna 60-1, the microcontroller 350 may obtain eight samples of an amplitude of the sine component and eight samples of an amplitude of the cosine component, and using these samples, the phase difference determination module 405 may determine eight phase angles, as described above. Subsequently, the microcontroller 350 repeats these steps in order to obtain eight phase angles for the second antenna 60-2 and/or the third antenna 60-3, and eight additional phase angles for the first antenna 60-1. Based on the differences between corresponding phase angle samples of a pair of antennas (i.e., a first sample of the first iteration of phase angles of antenna 60-1, a first sample of the first iteration of phase angles of antenna 60-2 or antenna 60-3, and a first sample of the second iteration of phase angles of antenna 60-1), a distance separating the respective pair of antennas 60, and a number of samples obtained during each iteration, the phase difference determination module 405 may determine the phase angle difference between the respective pair of antennas 60. In some embodiments, the phase difference determination module 405 may perform a phase angle unwrapping algorithm on the 0 Hz IF IQ signals in order to improve the accuracy of the phase angle difference determination.

Phase angle unwrapping consists of projecting phase angles forward past a natural circular wrap point (e.g., 180° (or π), or −180° (or −π)) by adding 360 degrees to each point that would otherwise wrap. In cases where the slope of the phase angles over time is such that multiple wraps may have occurred, multiple 360 (2π) additions may be added to interpolate a best fit same slope lines for the antennas. After unwrapping, the differences in the y intercept of the best fit same slope lines for the antennas are used to determine the phase differences. This is illustrated by FIG. 21.

Figure 21:
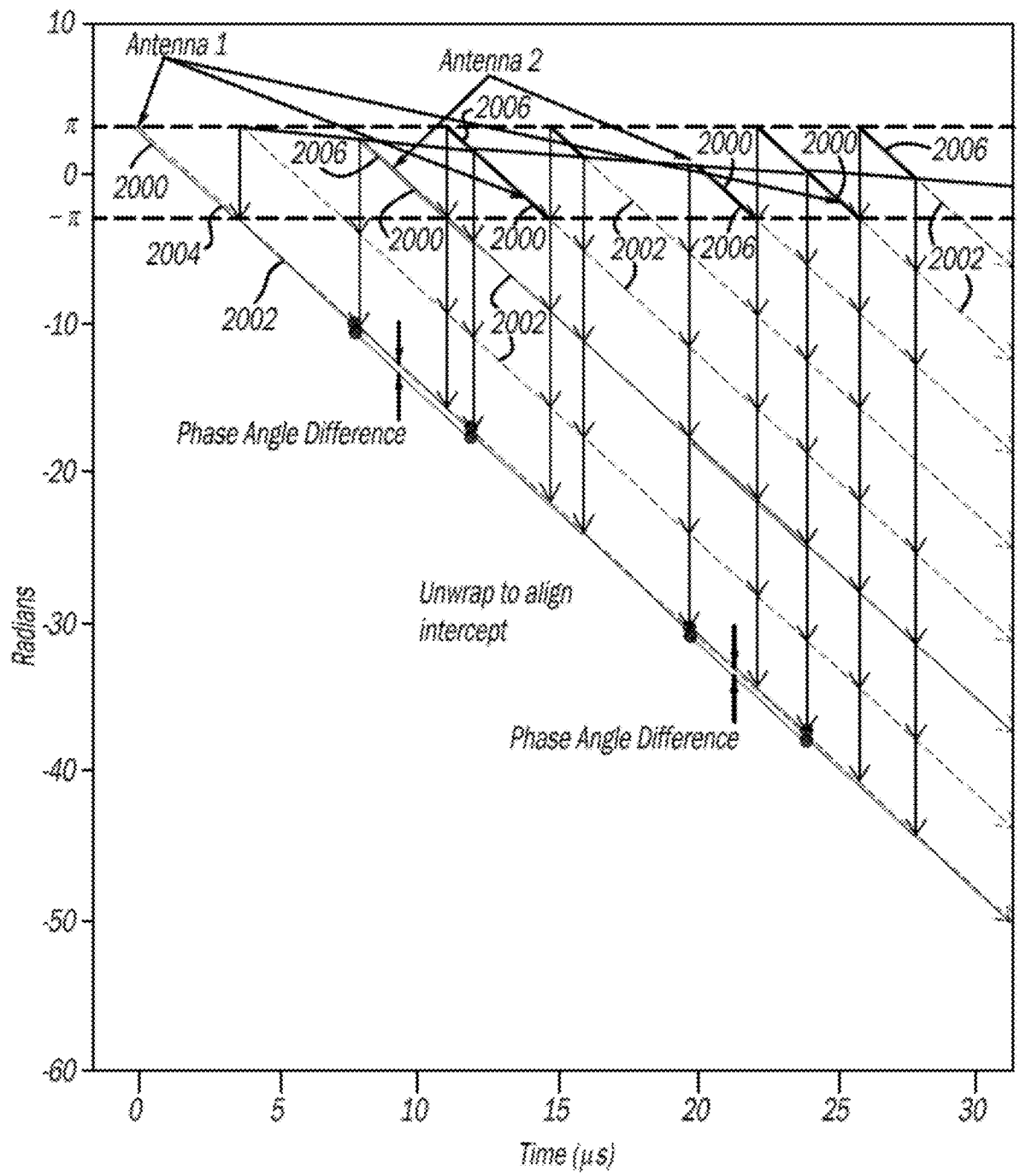
FIG. 21 is a phase angle vs. time plot provided as an example unwrapping and aligning of phase angle points for phase angle difference determinations in accordance with an embodiment of the present disclosure.

In FIG. 21, line segments 2000 representing a time series of phase angle samples in radians are shown for a first antenna and a second antenna. The line segments 2000 are first unwrapped, such that data samples to not transition from, for example, −180° to 180°, but rather continue in a same (or for this example in a negative direction). A portion of the points of the line segments 2000 for each of the antennas are then selected. As an example, this may include a last valid portion of the points of each of the line segments 2000.

Subsequent to selecting the portion of points, a best fit same slope for the line segments 2000 is determined. Since each of the antennas are receiving a RF signal having the same frequency (e.g., 250 kHz), the slopes of the line segments 2000 are the same or nearly the same. The best or average slope for the samples of the antennas may be calculated and a best-fit intercept of each set of line segments 2000 (one line segment for the first antenna and another line segment for the second antenna) is determined using the calculated slope. Projected lines 2002 extending along the line segments 2000 are then generated. Next a number of multiples of 2π is determined that needs to be added to each line segment 2006 that occurred in time subsequent to a first one of the line segment 2000 (or first line segment 2004) that would place the line segments 2006 on or within ±π of the projected line of the first line segment 2004. The line segments (or sets of line segments) 2006 may be moved down by 2π at a time until corresponding Y intercepts of projected lines of the line segments 2006 are within ±π radians of the Y intercept of the projected line of the first line segment 2004. Certain samples of the antennas that are not close (e.g., not within ±0.5 π) to the projected line of the first line segment 2004 may be discarded.

In one embodiment, the line segments for the first antenna may occur earlier in time and thus are shifted to align in time with the line segments for the second antenna or vice versa. The phase difference between the two antennas is the difference between the Y intercepts mod 2 π minus π of the projected lines of the resultant line segments or [(Antenna2Yintercept-Antenna1Yintercept)mod 2]. Example phase differences between the shifted and aligned line segments are shown in FIG. 21.

After unwrapping, the differences of the y intercept of the best fit same slope lines for the antennas can be used to determine the phase differences. In some embodiments, when the natural antenna spacing of the outer pair of antennas is close to a multiple of 180 degrees in phase difference for azimuth angles of +/−90 degrees azimuth, noise and multipath interference may cause the phase differences to wrap. Note that phase angle wrapping and phase difference wrapping are two different phenomena. Phase difference unwrapping is described with respect to FIGS. 22-23, where phase difference unwrapping for a 3 antenna system such as that disclosed is shown. A three antenna system may include three antennas disposed in a line (or in a row) and include first, second and third antennas, where the second (or center) antenna is disposed between the first and third antennas (or outer left and right antennas). There are three pairs of antennas; a first pair including the outer left and right antennas, a second pair including the left antenna and center antenna, and a third pair including the center antenna and the right antenna. In one embodiment, the phase difference wrapping is corrected based on phase difference between at least one of (i) the left antenna and the center antenna, or (ii) the center antenna and the right antenna. The physical distance between the outer antennas is such that the phase angle differences change between −180° and 180°. The physical distances between the other pairs of antennas is half the distance between the outer antennas, such that the phase angle differences as shown in FIG. 23 is between the −90° and 90°.

Figure 22:
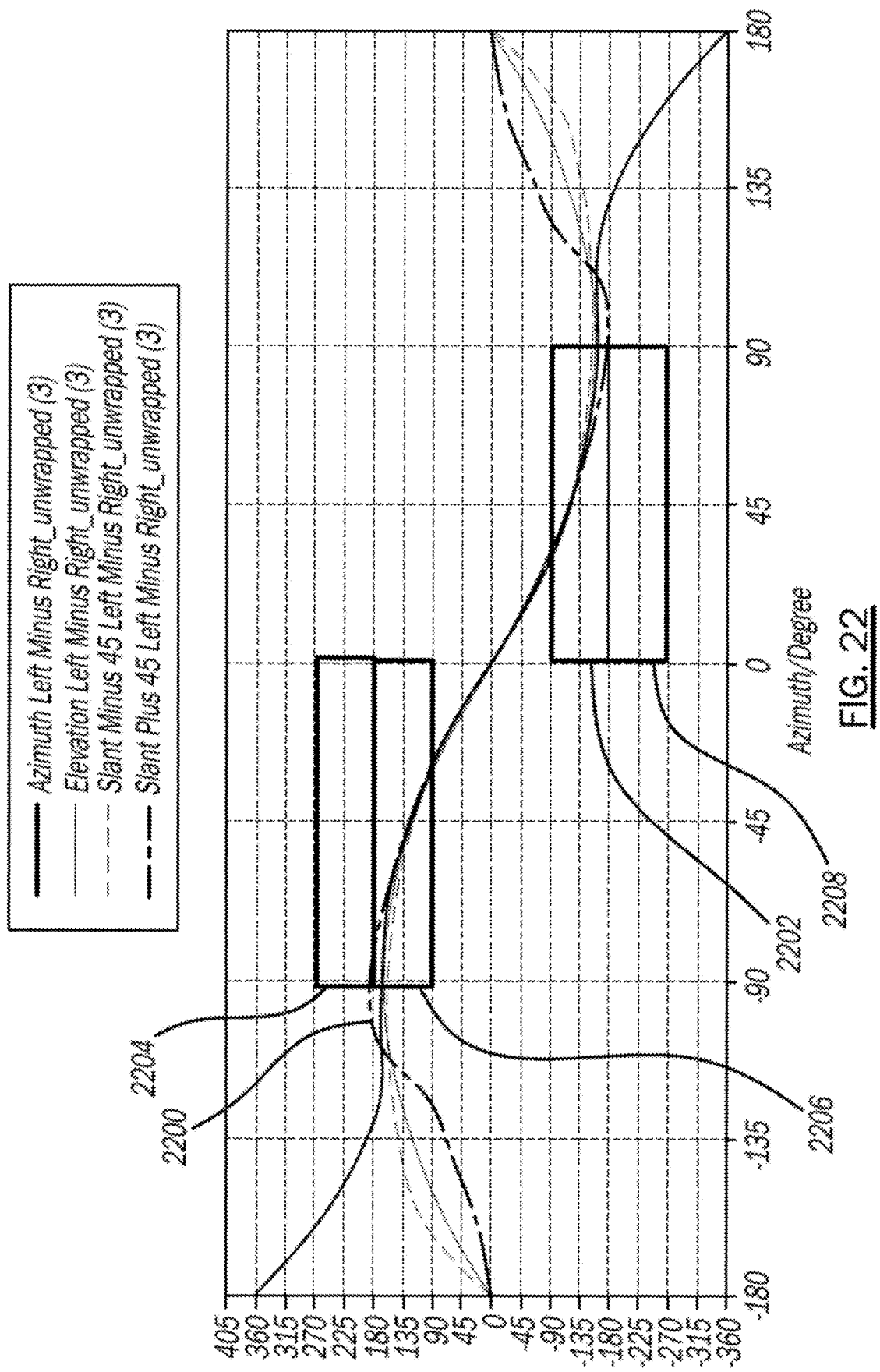
FIG. 22 is a phase angle difference vs azimuth angle plot illustrating differences in phase for an outer pair of antennas in accordance with an embodiment of the present disclosure.
Figure 23:
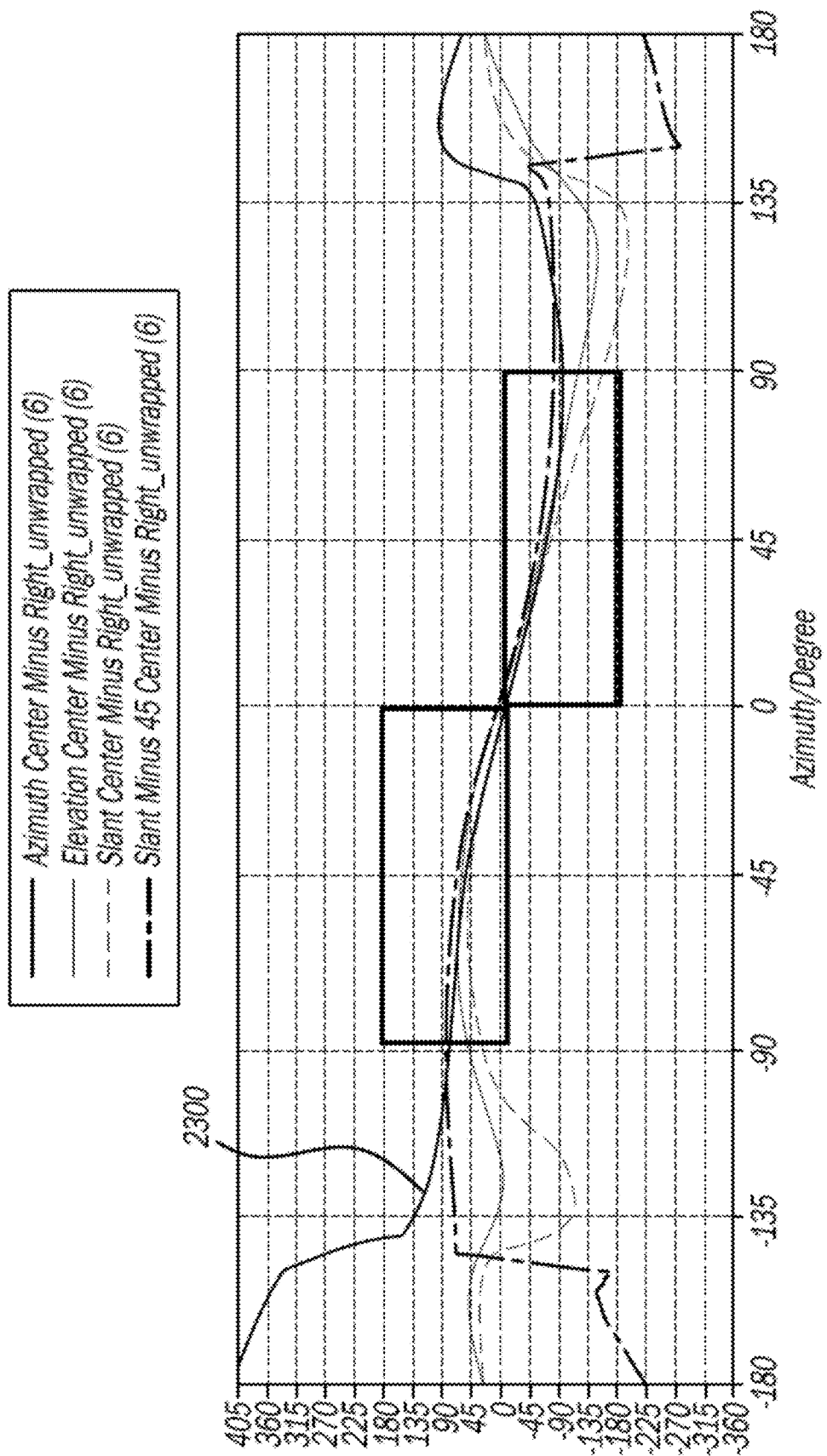
FIG. 23 is a phase angle difference vs azimuth angle plot illustrating differences in phase for an inner pair of antennas in accordance with an embodiment of the present disclosure.

FIG. 22 is a phase angle difference vs azimuth angle plot illustrating differences in phase for an outer pair of antennas. Curve 2200 is an example of azimuth left minus right (for the outer pair of antennas) unwrapped. The phase angle difference is near 0 when the azimuth angle between the I and Q components of a receive signal 0. The phase angle difference increases as the azimuth angle increases from 0 to ±90° as shown. When the azimuth angle decreases to less than −90°, the phase angle difference instead of, for example increasing from 180° to 181°, wraps to −179°. The microcontroller 350 corrects this wrapping based on the phase angle differences of the left-center and center-right antennas, such that the phase angle difference is 181° rather than −179°. This allows for a correct average phase angle difference to be determined at 1852.

When the magnitude of the phase angle difference between the outer antennas is greater than and/or exceeds 180°, the phase angle difference between the left-center and center-right antennas is checked and if the magnitudes of phase angle differences is for the outer pair of antennas is between 90-180°, then the sign of the phase angle difference for the outer antennas is corrected including the sign of the phase angle difference and changing the value of the phase angle difference. Curve 2300 is an example of azimuth center minus right (for one of the inner pair of antennas) unwrapped. In an embodiment, phase angle differences that are greater than a maximum threshold value (e.g., 180°) or less than minimum threshold value (e.g., −180°) are projected to be where the phase angle differences should be if wrapping did not occur. During unwrapping phase angle differences that fall in box 2202 may be unwrapped to be in box 2204 and phase angle differences that fall in box 2206 may be unwrapped to be in box 2208. By correcting the phase angle differences as describe, a correct average phase angle is provided.

The phase angle differences for a last predetermined period of time (e.g., 30 seconds) and/or the last predetermined number of phase angle differences may be averaged. In an embodiment, if the average of the phase angle differences for the left-center antenna signal and/or the phase angle differences for the center-right antenna signal for the last predetermined period is greater than 0° and the phase angle difference for the outer antenna pair is less than −90°, then the corresponding outer antenna pair phase angle difference is mapped to a value equal to the outer antenna phase angle difference plus 360°. Similarly, if the average of the phase angle differences for the left-center antenna signal and/or the phase angle differences for the center-right antenna signal for the last predetermined period is less than 0° and the phase angle difference for the outer antenna pair is greater than 90°, the corresponding outer antenna pair phase angle difference is mapped to a value equal to the outer antenna phase angle difference minus 360°. This is illustrated by corresponding portions of the boxes of FIGS. 22-23.

At 1856, the control algorithm 1800 of the microcontroller 350 or the control module 20 of the vehicle may determine, for the at least one pair of antennas 60 of the antenna system 58, an angle of arrival of the BLE signal based on the average phase angle difference of the remaining phase angle differences of the respective at least one pair of antennas. At 1860, the control algorithm 1800 may end. As an alternative, the angle of arrival may be determined by the control module 20 of the vehicle. In this alternative embodiment, the sensor 31 may transmit to the control module 20 the average phase angle difference of the remaining phase angle differences of the respective at least one pair of antennas.

Figure 24:
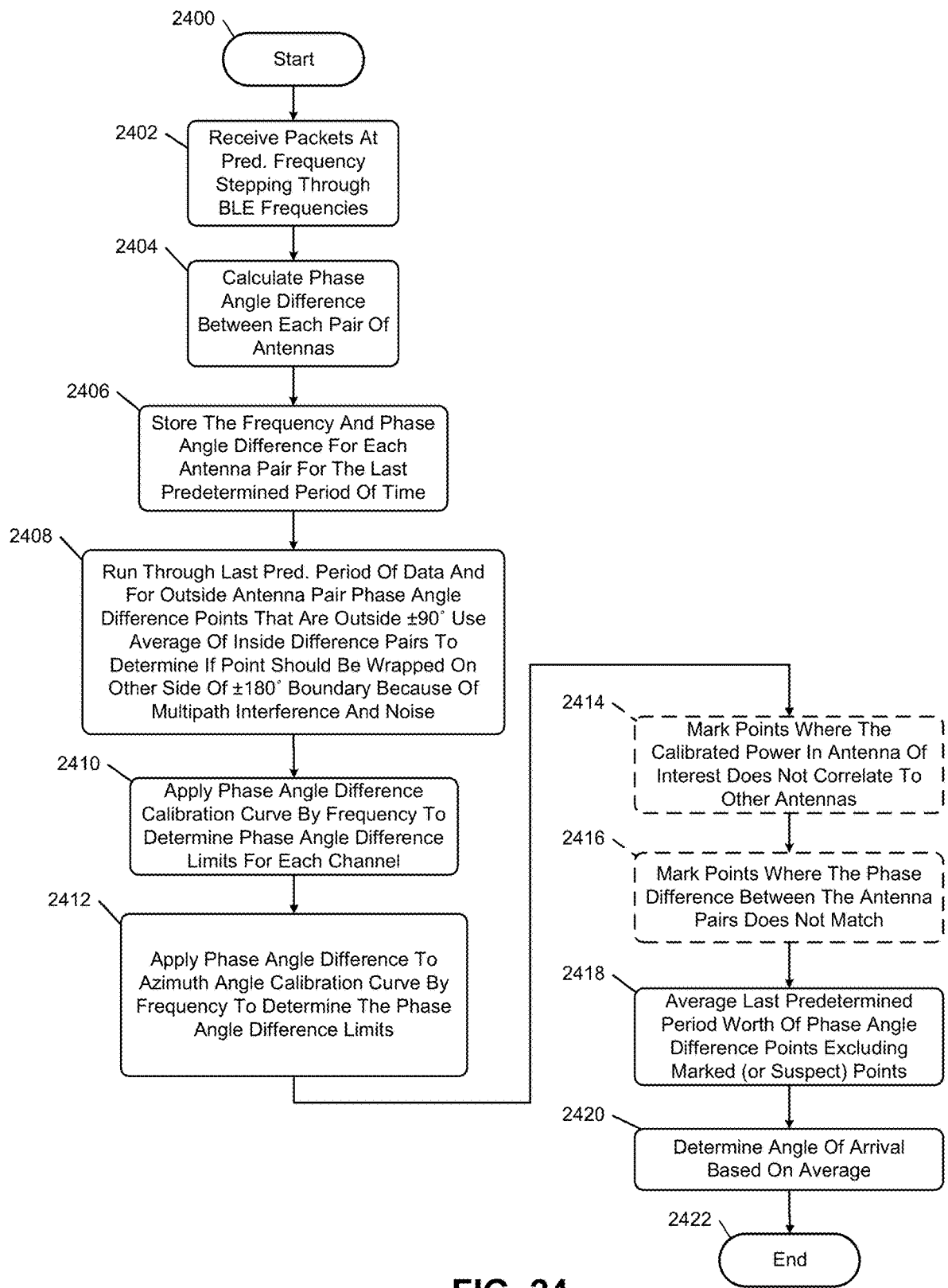
FIG. 24 is illustrates a method of determining angle of arrival in accordance with an embodiment of the present disclosure.

In FIG. 24, another example method of determining angle of arrival is shown. This method includes taking multiple readings on multiple channels, which are averaged. Some readings are marked for removal. The angle of arrival determination method may be implemented by the sensor 31, the microcontroller 350, or the control module 20. The operations of the method may be iteratively performed as with the operations of the other methods disclosed herein. The method of FIG. 24 may begin at 2400. At 2402, the antennas 60 (or 60') receive signals at a predetermined frequency (e.g., 30 Hz) stepping through BLE frequencies. At 2404, the microcontroller 350 determines the phase angle differences for each of the pairs of antennas (the outer pair, the left-center pair and the center-right pair) for the signals received at the frequencies.

At 2406, the microcontroller 350 stores the frequencies along with the corresponding phase angle differences for a last predetermined period (e.g., 1 second) in memory. At 2408, the microcontroller 350 reviews the phase angle differences to determine if any phase angle difference wrapping has occurred and corrects the phase angle difference wrapping of the outer pair of antennas based on the phase angle differences for the inner pairs (left-center and center-right) of antennas as described above.

At 2410, the microcontroller 350 applies a phase angle difference calibration curve as described above by frequency to determine phase angle difference limits for each channel. At 2412, the microcontroller 350 applies a phase angle difference to azimuth angle calibration curve by frequency to determine the phase angle difference limits.

The following operations 2414 and 2416 may be performed or skipped depending on the application. In one embodiment, operations 2414 and 2416 are not performed. At 2414, the microcontroller 350 may mark where the calibrated power in antenna of interest does not correlate to other antennas. For example of the calibrated power for one antenna is more than a predetermined amount different than the calibrated power for each of the other antennas.

At 2416, the microcontroller 350 marks points where the phase angle difference between the antenna pairs does not match. At 2418, the microcontroller 350 averages last predetermined period worth of phase angle difference points excluding marked (or suspect) points. At 2420, the microcontroller 350 determines the angle of arrival of the antennas based on the averages of the phase angle differences between the antennas. This includes the microcontroller 350 determining an azimuth angle between network (or mobile) device and the antennas. The method may end at 2422.

Subsequent to performing the methods of FIG. 21 and/or 24, the control module 20 may determine a location of the portable device 10 and/or distance between the portable device 10 and the vehicle 30 based on angle of arrivals determined for at least one of the antennas 60 of the respective sensors 31. As an example, the control module 20 may determine that the portable device 10 is located at an intersection of a first line representative of the angle of arrival at a first sensor 31A and a second line representative of the angle of arrival at a second sensor 31B.

FIG. 25 shows a receiving circuit 2500 for determining a phase angle between in-phase and quadrature components of a received radio frequency signal. The receiving circuit 2500 includes an antenna 2502, such as one of the antennas 60, 60' described above, mixers 2504, 2506, low pass filters 2508, 2510, analog-to-digital converters 2512, 2514 and a 0 Hz IF converter 2516. The mixers 2504, 2506 may receive a RF signal having a carrier frequency (e.g., 2.402 GHz signal) and a continuous wave (CW) tone signal (e.g., ±250 KHz) and remove the carrier wave signal to provide the CW tone signal. The signals out of the mixers are 90° phase shifted from each other and provided to the low pass filters 2508, 2510. Outputs of the low pass filters 2508, 2510 are then converted to digital signal and provided to the 0 Hz IF converter 2516 to provide the in-phase and quadrature phase signal from which a phase angle may be determined. The phase angle vector associated with the in-phase and quadrature phase signals rotates at the frequency of the CW tone signal (e.g., rotates at 250 KHz) about an origin of the corresponding I, Q coordinate plot.

Figure 26:
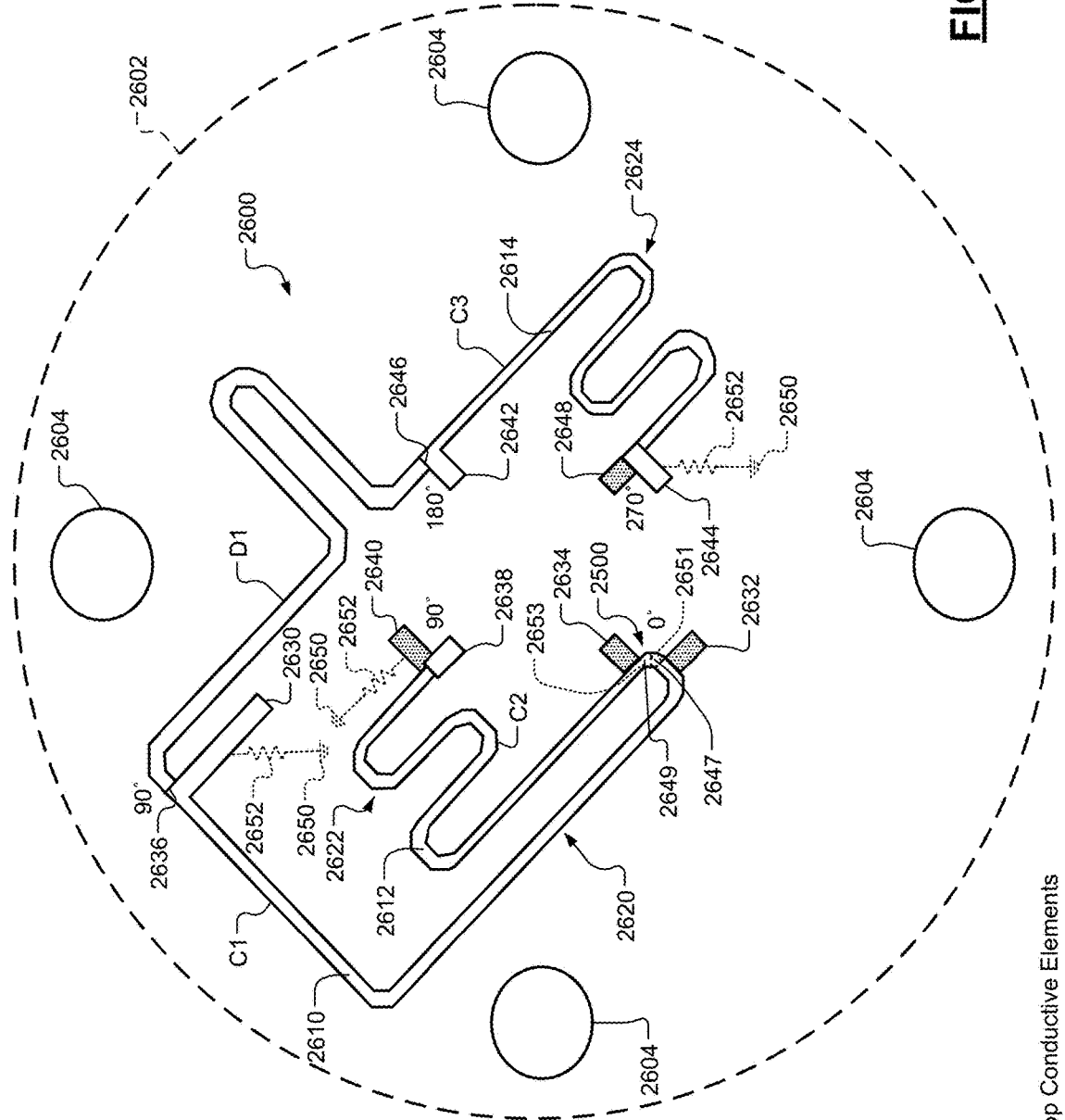
FIG. 26 is a top view of an example feed circuit implemented according to an embodiment of the present disclosure.

FIG. 26 shows a top view of a feed circuit 2600. The feed circuit 2600 is sized and has a "footprint" to fit within an outside perimeter of a corresponding antenna, such as a quadrifilar antenna and/or one of the antennas referred to and/or described herein. An example circular perimeter 2602 of an antenna is shown. The antenna includes mounting locations represented by circles 2604, which in one embodiment are heat stake locations, for example for heat stakes 131 of FIGS. 13-14. The feed circuit 2600 is shown as being located in a particular location relative to the perimeter 2602 and the mounting locations 2604 may be shifted to be in a different location.

Figure 29:
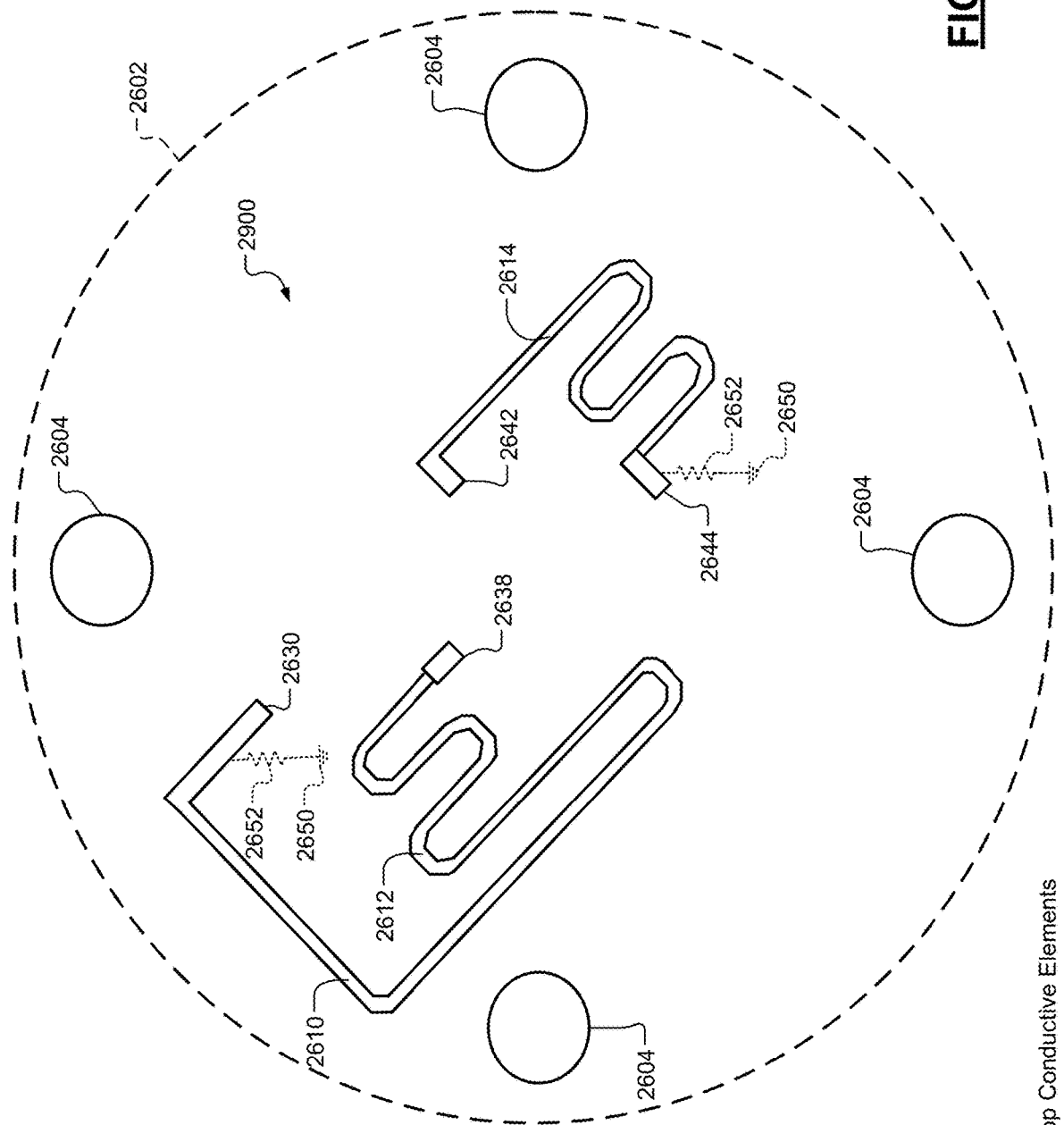
FIG. 29 is a top view of a top portion of the feed circuit of FIG. 26 illustrating top conductive elements of couplers of the feed circuit.
Figure 30:
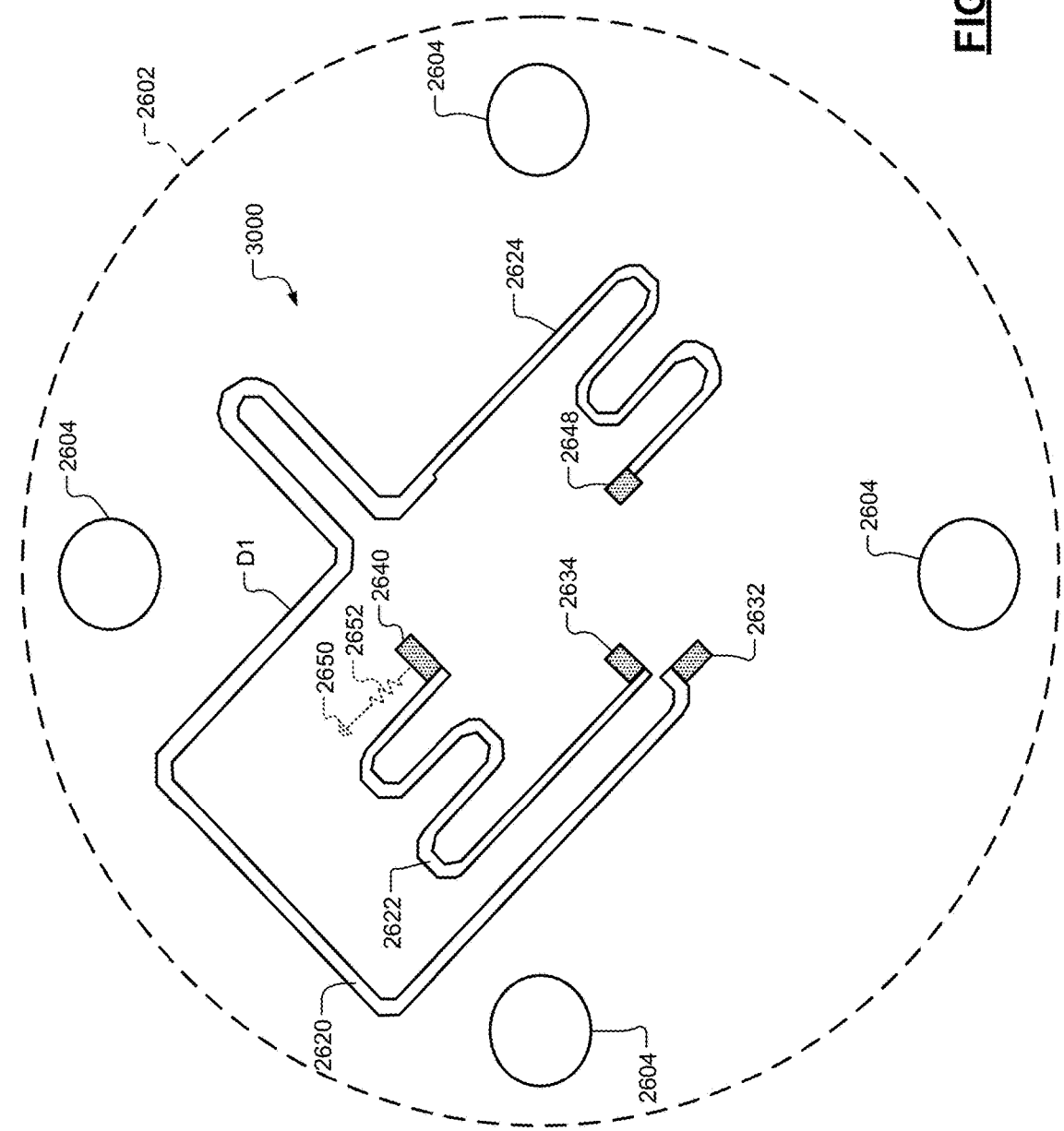
FIG. 30 is a top view of a bottom portion of the feed circuit of FIG. 26 illustrating bottom conductive elements of the couplers and delay line of the feed circuit.

The feed circuit 2600 includes three couplers C1, C2, C3 and a delay line D1. Each of the couplers C1, C2, C3 includes two conductive elements a top conductive element (designated 2610, 2612, 2614) and a bottom conductive element (designated 2620, 2622, 2624). The top conductive elements 2610, 2612, 2614 are on a different layer of the feed circuit 2600 than the bottom conductive elements 2620, 2622, 2624. The top conductive elements 2610, 2612, 2614 are shown in FIG. 29. The bottom conductive elements 2620, 2622, 2624 are shown in FIG. 30.

The top conductive elements 2610, 2612, 2614 are not in contact with the bottom conductive elements 2620, 2622, 2624. The top conductive elements 2610, 2612, 2614 overlap and are sized and shaped to be similar to sizes and shapes of the bottom conductive elements 2620, 2622, 2624. In the example shown, the top conductive elements 2610, 2612, 2614 are the same size and shape as the bottom conductive elements 2620, 2622, 2624. For this reason, only the top conductive elements 2610, 2612, 2614 are visible in FIG. 26.

Figure 28:
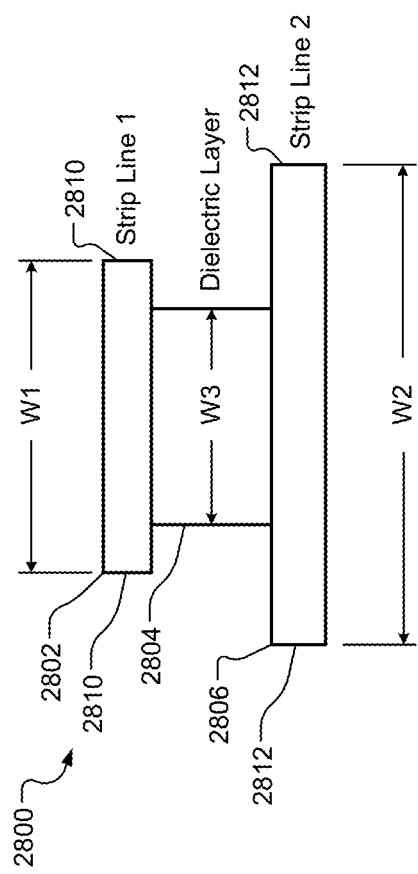
FIG. 28 is an end cross-sectional view of an example coupler according to an embodiment of the present disclosure.

In another embodiment, (i) first centerlines extending from end-to-end of the top conductive elements 2610, 2612, 2614 are in horizontal alignment with and over corresponding second centerlines extending from end-to-end of the bottom conductive elements 2620, 2622, 2624, and (ii) widths of the top conductive elements 2610, 2612, 2614 are smaller than widths of the bottom conductive elements 2620, 2622, 2624. An example of this is shown in FIG. 28. In yet another embodiment, (i) first centerlines extending from end-to-end of the top conductive elements 2610, 2612, 2614 are in horizontal alignment with and over corresponding second centerlines extending from end-to-end of the bottom conductive elements 2620, 2622, 2624, and (ii) widths of the bottom conductive elements 2620, 2622, 2624 are smaller than widths of the top conductive elements 2610, 2612, 2614. Widths of the conductive elements 2610, 2612, 2614, 2620, 2622, 2624 may be the same for entire lengths of the conductive elements 2610, 2612, 2614, 2620, 2622, 2624.

The delay line D1 extends from the first coupler C1 to the third coupler C3. The bottom conductive element 2620 and the bottom conductive element 2624 extend from different ends of the delay line D1 and may be integrally formed with the delay line D1 as a single conductive element.

The top conductive element 2610 extends from a first tab 2630 to a location between tabs 2632 and 2634, which are respectively connected to the bottom conductive elements 2620 and 2622. The bottom conductive element 2620 extends from an end 2636 of the delay line D1 to the tab 2632. The top conductive element 2612 extends from the location between the tabs 2632 and 2634 to tab 2638. The bottom conductive element 2622 extends from tab 2634 to tab 2640. The top conductive element 2614 extends from tab 2642 to tab 2644. The bottom conductive element 2624 extends from a second end 2646 of the delay line D1 to tab 2648. No bottom conductive element exists between the tabs 2632 and 2634 and below end portions 2647, 2649 of the top conductive elements 2610, 2612. Ends 2651, 2653 of the bottom conductive elements 2620, 2622 near tabs 2632, 2634 are shown. As used herein, a tab may be referred to and/or replaced by a terminal.

Terminals of conductive elements of the antenna, such as third portions 110-3, 112-3, 114-3, 116-3 of antenna elements 90, 92, 94, 96 of FIG. 7C or the like, are in contact with and/or connect to the tabs 2634, 2638, 2642 and 2648 and/or symmetrically located connection points. The tabs 2634, 2638, 2642 and 2648 and/or other symmetrically located connection points may be in a same layer as the top conductive elements 2610, 2612, 2614 or may be in an antenna mounting layer disposed above the layer of the top conductive elements 2610, 2612, 2614. The tabs 2634, 2638, 2642 and 2648 and/or other symmetrically located connection points may be in different layers. The connection points may be symmetric about, for example, lines extending through centers of opposing pairs of the antenna mounting locations 2604.

Signals at the tabs 2634, 2638, 2642 and 2648 are 90° out of phase from each other. In one embodiment, the signals at the tabs 2634, 2638, 2642 and 2648 are at 0°, 90°, 180° and 270°, respectively. In an embodiment, the tab 2632 is a feed point at which a signal is provided for transmission or a combined signal having received data is forwarded to a filter circuit. When receiving signals from the antenna, the feed circuit 2600 combines the received signals via the couplers C1, C2, C3 and the delay line D1 to provide the combined signal. During transmission, a signal is provided from a filter circuit to the tab 2632. The signal is coupled to the top conductive elements 2610 and 2612 and then received 90° out-of-phase at the tabs 2630 and 2638. The 90° out-of-phase signal coupled to the delay line D1 and then coupled to and received 180° out-of-phase at the tab 2642. The 180° out-of-phase signal is then coupled to and received 270° out-of-phase at the tab 2648. This allows a feed signal to be phase shifted multiple times and transmitted at different phases from the tabs 2634, 2640, 2646, 2648.

Figure 27:
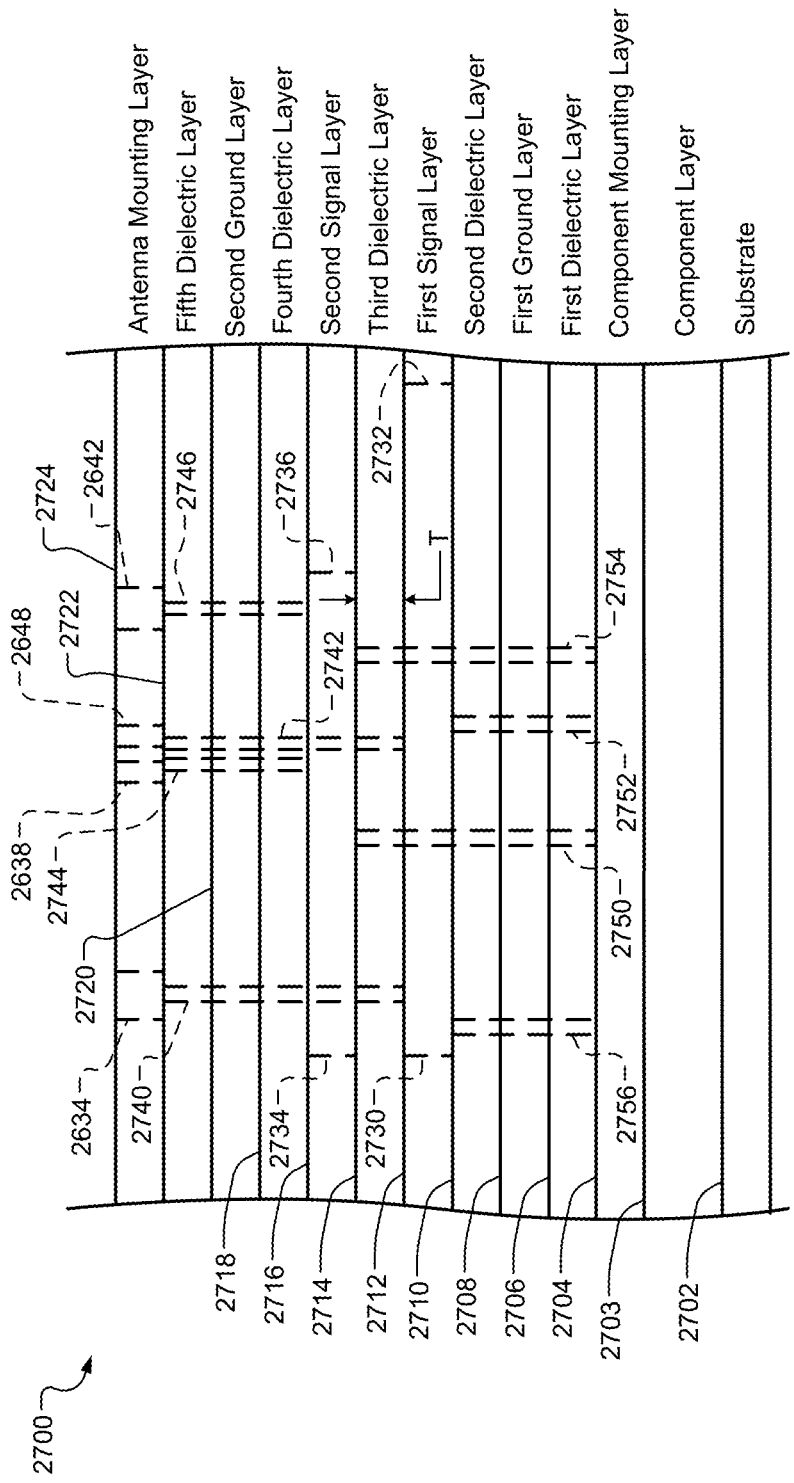
FIG. 27 is a cross-sectional view of a portion of the feed circuit of FIG. 26 illustrating example via connections according to an embodiment of the present disclosure.

In an embodiment, tabs 2630, 2640, 2642 and 2644 are connected to a ground reference 2650 via resistors 2652. The resistors 2652 may be located in a component layer of the feed circuit 2600. As an example, the resistors 2652 may be 50 Ohm (Ω) resistors. An example component layer is shown in FIG. 27. The ground reference 2650 may be connected to and/or at a same voltage potential as one or more ground layers of the feed circuit 2600. Example ground layers are shown in FIG. 27.

The top conductive elements 2610, 2612, 2614 are disposed over the bottom conductive elements 2620, 2622, 2624 in order for there to be "broad-side" coupling between the top conductive elements 2610, 2612, 2614 and the bottom conductive elements 2620, 2622, 2624. This is different than having conductive elements disposed in a same layer side-by-side, where edge coupling exists. Broadside coupling provides more surface area for coupling between "broad" opposing faces of the conductive elements than edge coupling. The broad-side coupling introduces an artifact on a first conductive element of a signal transmitted on a second conductive element broad-side coupled to the first conductive element.

The widths, lengths, and thicknesses of the conductive elements 2610, 2612, 2614, 2620, 2622, 2624 and distances between opposing pairs of the conductive elements 2610, 2612, 2614 and 2620, 2622, 2624 are predetermined and set to provide the appropriate coupling. The stated dimensions may be selected to provide a lambda ($\lambda$) over four or one quarter (¼) wavelength structure.

Although the conductive elements 2610, 2612, 2614, 2620, 2622, 2624 and delay line D1 are each shown having a particular pattern, the patterns may be altered while maintaining the envelope of the feed circuit to be within the envelope or perimeter 2602 of the antenna. The patterns of the conductive elements 2610, 2612, 2614, 2620, 2622, 2624 and delay line D1 are shown as an example that includes lengths of the conductive elements 2610, 2612, 2614, 2620, 2622, 2624 and delay line D1 being the same or similar to provide the stated phase shifts. The lengths of the conductive elements 2610, 2612, 2614, 2620, 2622, 2624 and delay line D1 may be the same or within a predetermined amount of each other to provide equivalent phase shifts between tabs. The lengths may be slightly different to compensate for associated phase delays associated with, for example, coupling a signal between a top conductive element and a bottom conductive element.

Referring now also to FIG. 27, which shows a cross-sectional view of a portion 2700 of the feed circuit 2600 of FIG. 26 implemented as a PCB. The feed circuit 2600 may include a substrate 2702, a component layer 2703, a component mounting layer (or bottom conductive layer) 2704, a first dielectric layer 2706, a first ground layer 2708, a second dielectric layer 2710, a first signal layer 2712, a third dielectric layer 2714, a second signal layer 2716, a fourth dielectric layer 2718, a second ground layer 2720, a fifth dielectric layer 2722 and an antenna mounting layer 2724. The component layer 2703 may include electrical components, which may be mounted on the substrate 2702 and connected to the component mounting layer 2704. The component layer 2703 may include a housing (not shown) for housing one or more components.

An outer edge of the bottom conductive element 2620 and an outer edge of the delay line D1 are shown as dashed lines 2730, 2732 in the first signal layer 2712. An outer edge of the top conductive element 2610 and an outer edge of the top conductive element 2614 are shown as dashed lines 2734, 2736 and in the second signal layer 2716.

The 2634, 2638, 2642, 2648 are shown as being disposed in the antenna mounting layer 2724. The tabs 2634, 2648 are connected to the bottom conductive elements 2622, 2624 in the first signal layer 2712 by vias 2740, 2742. The tabs 2638, 2642 are connected to the top conductive elements 2612, 2614 in the second signal layer 2716 by vias 2744, 2746.

The tabs 2630, 2640, 2652 are connected to the resistors 2652, which are in the component mounting layer 2704 by vias 2750, 2752, 2754. The tab 2632 is connected to a filter circuit included in the component mounting layer 2704 by via 2756. The component mounting layer 2704 may include conductive traces in a predetermined pattern. At least some of the conductive traces may be connected to components in the component layer 2703. The component layer 2703 may include other components such as, for example, the components included in one of the filter circuits 160, the switching circuit 170, and/or the microcontroller 350 of FIG. 16A.

The ground layers 2708, 2720 serve multiple purposes and may be referred to as metal layers. The first (or bottom) ground layer 2708 provides a ground separation layer between the component layer 2703 and the signal layers 2712, 2716 and may be used to route signals associated with the component layer 2703. The second (or top) ground layer 2720 provides a ground separation layer between the antenna and the signal layers 2712, 2716. The second ground layer 2720 isolates the antenna from the signal layers 2712, 2716 and allows the antenna to be directional. The ground layers 2708, 2720 also allow the couplers C1, C2, C3 of the signals layers 2712, 2716 to function appropriately. The signal layers 2712, 2716 include conductive material associated with the conductive elements 2610, 2612, 2614, 2620, 2622, 2624 and delay line D1 and dielectric material disposed between portions of the conductive elements 2610, 2612, 2614, 2620, 2622, 2624 and delay line D1.

In one embodiment, the layers 2706, 2708, 2710, 2712, 2714, 2716, 2718, 2720, 2722, 2724 are thin layers. As an example, each of these layers may be 0.06 millimeters (mm) thick. An example thickness T is shown for the layer 2712. The thin layers provide a thin core to achieve balanced coupling between conductive elements of the signals layers 2712, 2716.

FIG. 28 shows an end cross-sectional view of a coupler 2800, which includes a top conductive element 2802, a dielectric layer 2804 and a bottom conductive element 2806. The coupler 2800 may refer to any of the couplers C1, C2, C3 of FIG. 26 and has a non-identical layer structure, where the top conductive element 2802 as shown has a smaller width W1 than a width W2 of the bottom conductive element 2806. The width W1 may be larger than width W3 of the dielectric layer 2804. In another embodiment, the width W3 is larger than the widths W1 and W2. FIG. 28 is provided as an example to show how edges 2810 of the bottom conductive element 2806 extend out further than edges 2812 of the top conductive element 2802. By having one of the conductive elements 2802, 2806 wider than the other one of the conductive elements 2802, 2806, this assures that there is corresponding opposing conductive surface area, along a length of the conductive element having the smaller width, equivalent in size to the surface area of a broad face of the conductive element having the smaller width. This assures that there is no amplitude change and/or unintended phase change in transmitted signals along lengths of the conductive elements due to the sizes of the opposing conductive surface areas being different and/or shifted relative to each other. When the amount of opposing surface area changes, due to offset and/or opposing conductive surface areas of different sizes, the amplitude of the signal can change and the signal can be phase shifted. The provided structure assures that there is an opposing conductive surface provided by conductive element 2806 for an entire surface area of an opposing broad face of the conductive element 2802.

The stated relationships between opposing conductive elements provides a unique implementation to compensate for registration tolerances, which can be a defect in a PCB where offsets between layers occurs during manufacturing. The conductive elements 2802, 2806 may be referred to as "strip lines". One of the strip lines is wider than the other one of the strip lines, which allows for tolerance requirements to be decreased, which makes manufacturing easier and/or less costly.

FIG. 29 shows a top portion 2900 of the feed circuit 2600 of FIG. 26. The top portion 2900 fits within the circular perimeter 2602 of the antenna. The antenna has the mounting locations represented by the circles 2604. The top portion 2900 includes the top conductive elements 2610, 2612, 2614 and the tabs 2630, 2638, 2642, 2644. The tabs 2630, 2638, 2642, 2644 are connected to resistors 2652, which are connected to ground references 2650.

FIG. 30 shows a bottom portion 3000 of the feed circuit 2600 of FIG. 26. The bottom portion 3000 fits within the circular perimeter 2602 of the antenna. The antenna has the mounting locations represented by the circles 2604. The bottom portion 3000 includes the bottom conductive elements 2620, 2622, 2624, the delay line D1 and the tabs 2632, 2634, 2640, 2648. The tabs 2632, 2634, 2640, 2648 are connected to resistors 2652, which are connected to ground references 2650.

Figure 31:
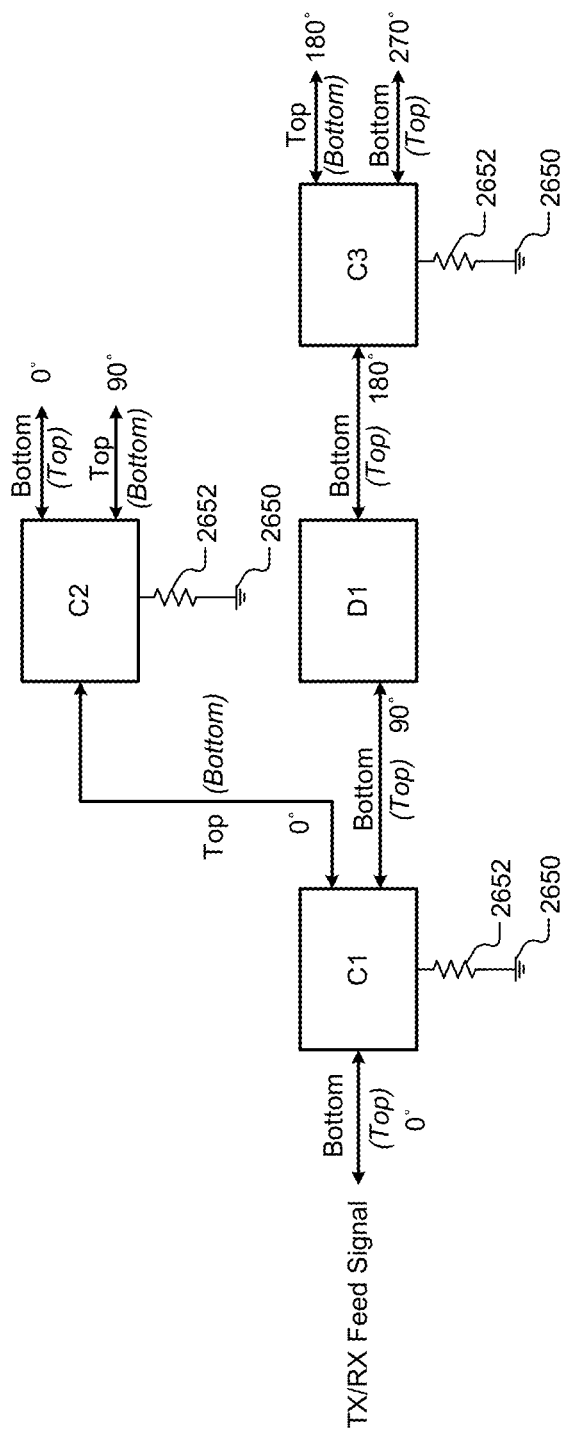
FIG. 31 is a functional block diagram representation of the feed circuit of FIG. 26.

FIG. 31 shows a functional block diagram representation 3100 of the feed circuit 2600 of FIG. 26. The representation 3100 includes the couplers C1-C3 and the delay line D. The coupler C is connected to the coupler C2 and the delay line D1, which is connected to the coupler C3. As an example, the coupler C1 may be connected to an integrated circuit (or chip), such as a processor chip and receive signals from and/or transmit signals to the antenna. The antenna may be connected to the couplers C2 and C3.

A transmit or receive feed signal (hereinafter "feed signal") is shown at different ends of the couplers C1-C3 and the delay line D1 having corresponding phases. The feed signal has 0° phase at a point between the couplers C1 and C2. The feed signal has 90° phase at a point between the coupler C1 and the delay line D1. The feed signal has a phase of 0° and a phase of 90° at respective conductive ends of the coupler C2, which are connected to the antenna. The feed signal has 180° phase at a point between the delay line D1 and the coupler C3. The feed signal has 180° phase and 270° phase at respective conductive ends of the coupler C3, which are connected to the antenna.

The phase of the feed signal shifts by 90° when the feed signal does not transition between top and bottom portions (or signal layers) of the couplers C1-C3 and the delay line D1 of the feed circuit 2600 of FIG. 26 and the feed signal travels along one of the couplers C1-C3 and the delay line D1. There is not a phase shift when the feed signal does transition between top and bottom portions (or signal layers) of the couplers C1-C3 and the delay line D1 of the feed circuit 2600 of FIG. 26. The terms "bottom" and "top" are shown in FIG. 31 to illustrate two different arrangements; one is shown with the non-italicized versions of "top" and "bottom" and the other is shown with italicized parenthetical versions of the terms "top" and "bottom". Depending on how the feed signal is initially provided to the feed circuit 2600, the phase signal may be on the top signal layer or bottom signal layer of the feed circuit. As an example, the top signal layer may be the second signal layer 2716 of FIG. 27 and the bottom signal layer may be the first signal layer 2712 of FIG. 27.

The first example has the phase signal provided on the bottom signal layer to coupler C1. The feed signal does not phase shift across coupler C1 to the top signal layer, but does phase shift across coupler C1 to the bottom signal layer. The 0° phase signal is on the top signal layer between the couplers C1 and C2 and the 90° phase signal is on the bottom signal layer between the coupler C1 and the delay line D1. The 0° phase signal is on the bottom signal layer at a point between the coupler C2 and the antenna. The 90° phase signal is on the top signal layer at a point between the coupler C2 and the antenna. The feed signal is not transitioned between top and bottom signal layers across the delay line D1 and the phase shifts across the delay line D1 from 90° to 180°. The 180° phase signal is on the top signal layer at a point between the coupler C3 and the antenna. The 270° phase signal is on the bottom signal layer at a point between the coupler C3 and the antenna.

The second example has the feed signal provided on the top signal layer. The 0° phase signal is on the bottom signal layer between the couplers C1 and C2 and the 90° phase signal is on the top signal layer between the coupler C1 and the delay line D1. The 0° phase signal is on the top signal layer at a point between the coupler C2 and the antenna. The 90° phase signal is on the bottom signal layer at a point between the coupler C2 and the antenna. The 180° phase signal is on the bottom signal layer at a point between the coupler C3 and the antenna. The 270° phase signal is on the top signal layer at a point between the coupler C3 and the antenna.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A feed circuit for feeding an antenna, the feed circuit comprises:
   a first coupler comprising a first pair of opposing conductive elements;
   a second coupler comprising a second pair of opposing conductive elements;
   a third coupler comprising a third pair of opposing conductive elements;
   a delay line;
   a first plurality of terminals configured to connect to the antenna;
   a second plurality of terminals connected to a ground reference; and a feed terminal connected to the first coupler and configured to receive at least one of a transmit signal to be transmitted from the antenna or a combined received signal from the antenna, wherein the first plurality of terminals are connected to the second coupler and the third coupler and configured to output a signal at different phases to conductive elements of the antenna, and the second plurality of terminals are connected to the first coupler, the second coupler and the third coupler.

2. The feed circuit of claim 1, wherein the delay line extends from the first coupler to the third coupler.

3. The feed circuit of claim 1, wherein:

the feed terminal is configured to receive the transmit signal to be transmitted from the antenna; and each of the first coupler, the second coupler, the third coupler and the delay line phase shift the transmit signal by 90°.

4. The feed circuit of claim 1, wherein:

the first opposing pair of conductive elements comprises a first conductive element disposed over a second conductive element;

the second opposing pair of conductive elements comprises a third conductive element disposed over a fourth conductive element; and the third opposing pair of conductive elements comprises a fifth conductive element disposed over a sixth conductive element.

5. The feed circuit of claim 4, wherein:

a width of the first conductive element is smaller than a width of the second conductive element;

a width of the third conductive element is smaller than a width of the fourth conductive element; and a width of the fifth conductive element is smaller than a width of the sixth conductive element.

6. The feed circuit of claim 4, wherein:

a shape of the first conductive element matches a shape of the second conductive element;

a shape of the third conductive element matches a shape of the fourth conductive element; and a shape of the fifth conductive element matches a shape of the sixth conductive element.

7. The feed circuit of claim 1, wherein only one conductive element extends between the feed terminal and one of the first plurality of terminals.

8. The feed circuit of claim 1, wherein:

the first opposing pair of conductive elements include a first conductive element and a second conductive element;

the second opposing pair of conductive elements includes a third conductive element and a fourth conductive element;

the second conductive element is connected to the feed terminal;

fourth conductive element is connected to one of the second plurality of terminals;

the first conductive element and the third conductive element are integrally formed as a single conductive element, which extends between the feed terminal and the one of the second plurality of terminals; and the second conductive element and the fourth conductive element do not extend between the feed terminal and the one of the second plurality of terminals.

9. An angle-of-arrival measurement system comprising:

the feed circuit of claim 1;

the antenna; and a control module configured to determine an angle-of-arrival of the received signal.

10. The angle-of-arrival measurement system of claim 9, wherein a perimeter of the feed circuit is smaller than a perimeter of the antenna.

11. The angle-of-arrival measurement system of claim 9, wherein:

the antenna is a quadrifilar helix antenna; and the quadrifilar helix antenna comprises conductive elements connected respectively to the first plurality of terminals.

12. A feed circuit for an antenna, the feed circuit comprising:

a component layer comprising resistors, wherein the resistors are connected to a ground reference;

a first ground layer disposed on the component layer;

a first signal layer disposed on the first ground layer and comprising a feed terminal, first conductive elements and a delay line, wherein one of the first conductive elements is connected to one of the resistors;

a second signal layer disposed on the first signal layer and comprising second conductive elements, wherein first ones of the second conductive elements are connected to some of the resistors;

a second ground layer disposed on the second signal layer; and an antenna mounting layer comprising a first plurality of terminals configured to connect to the antenna and configured to transmit via the antenna phase shifted versions of a signal received at the feed terminal, wherein the first plurality of terminals are configured to connect to some of the first conductive elements and second ones of the second conductive elements.

13. The feed circuit of claim 12, wherein two of the second conductive elements are connected to two of the resistors.

14. The feed circuit of claim 12, wherein the first ground layer transfers signals of components in the component layer.

15. The feed circuit of claim 12, wherein the second ground layer isolates the antenna from the first signal layer and the second signal layer.

16. The feed circuit of claim 12, wherein widths of the first conductive elements are wider than widths of the second conductive elements.

17. The feed circuit of claim 12, wherein the first conductive elements and the second conductive elements provide a first coupler, a second coupler, and a third coupler.

18. The feed circuit of claim 17, wherein the first coupler, the second coupler, the third coupler, and the delay line phase shift a transmit signal by 90°.

19. The feed circuit of claim 17, further comprising vias connecting the plurality of terminals to the some of the first conductive elements and second ones of the second conductive elements.

20. The feed circuit of claim 17, wherein:

a second plurality of terminals connected to one of the first conductive elements and two of the second conductive elements; and vias connecting the second plurality of terminals respectively to the resistors.

* * * * *